US009137881B2

(12) United States Patent
Yamada et al.

(10) Patent No.: US 9,137,881 B2
(45) Date of Patent: Sep. 15, 2015

(54) DISCHARGE LAMP LIGHTING APPARATUS

(75) Inventors: Koji Yamada, Himeji (JP); Keiichi Matsumoto, Himeji (JP); Takashi Yamashita, Himeji (JP); Takanori Samejima, Himeji (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 315 days.

(21) Appl. No.: 13/994,352

(22) PCT Filed: Nov. 1, 2011

(86) PCT No.: PCT/JP2011/075130
§ 371 (c)(1),
(2), (4) Date: Jun. 14, 2013

(87) PCT Pub. No.: WO2012/081320
PCT Pub. Date: Jun. 21, 2012

(65) Prior Publication Data
US 2013/0271024 A1   Oct. 17, 2013

(30) Foreign Application Priority Data

Dec. 14, 2010  (JP) ................................. 2010-277696
Dec. 14, 2010  (JP) ................................. 2010-277697
Dec. 22, 2010  (JP) ................................. 2010-285635

(51) Int. Cl.
| H05B 37/02 | (2006.01) |
| H05B 41/36 | (2006.01) |
| H05B 41/288 | (2006.01) |
| H05B 41/292 | (2006.01) |

(52) U.S. Cl.
CPC ............ *H05B 41/36* (2013.01); *H05B 41/2883* (2013.01); *H05B 41/2925* (2013.01); *Y02B 20/208* (2013.01)

(58) Field of Classification Search
None
See application file for complete search history.

(56) References Cited

U.S. PATENT DOCUMENTS

| 7,436,121 | B2 | 10/2008 | Kobayashi et al. | |
| 2010/0127631 | A1* | 5/2010 | Okamoto et al. | 315/246 |
| 2010/0128232 | A1* | 5/2010 | Kagata et al. | 353/85 |
| 2011/0128508 | A1* | 6/2011 | Yamada et al. | 353/85 |

FOREIGN PATENT DOCUMENTS

| JP | 2005-235445 A | 9/2005 |
| JP | 2010-123567 A | 6/2010 |
| JP | 2010-165607 A | 7/2010 |

* cited by examiner

*Primary Examiner* — Long Nguyen
(74) *Attorney, Agent, or Firm* — Roberts Mlotkowski Safran & Cole, P.C.; David S. Safran

(57) ABSTRACT

A discharge lamp lighting device having a discharge lamp which has a pair of tungsten-made electrodes each having a protrusion formed at the tip thereof and an electric power feeding device which feeds an alternate current electric power to the discharge lamp, and is characterized in that the power feeding device has a function of switching between a first lighting mode in which a rated electric power is fed to the discharge lamp and a second lighting mode in which a lower electric power than the rated electric power is fed to the discharge lamp to light the discharge lamp, and therefore, can control electric power to be fed to the discharge lamp under such conditions that the average electric power change rate becomes 0.01-2.1 W/s during a mode switching period in which the switching from the first lighting mode into the second lighting mode is carried out.

14 Claims, 10 Drawing Sheets

Fig. 7(a) 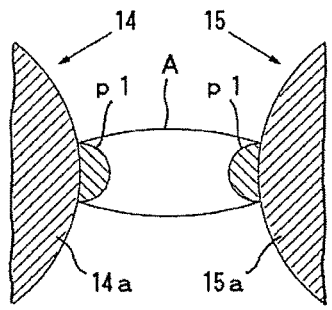 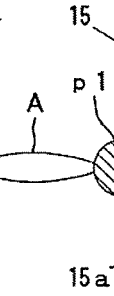 Fig. 7(b)
Fig. 7(c) 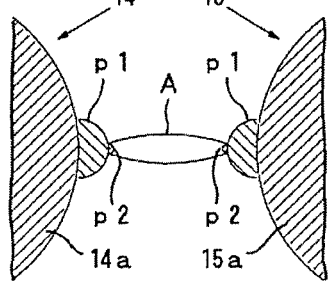 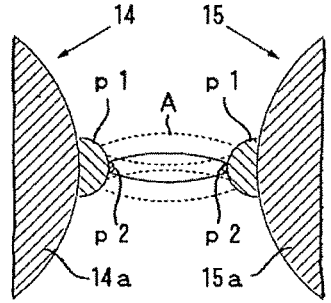 Fig. 7(d)
Fig. 7(e) 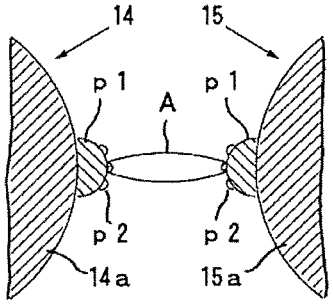 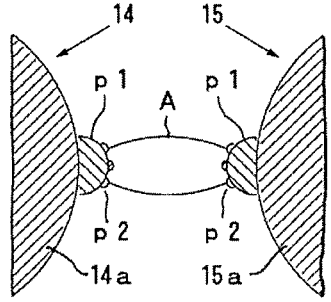 Fig. 7(f)

DISCHARGE LAMP LIGHTING APPARATUS

BACKGROUND OF THE INVENTION

1. Field of the Invention

The present invention relates to a discharge lamp lighting apparatus which can be preferably used as a light source for a projector apparatus.

2. Description of Related Art

A projecting-type projector apparatus is required to project an image being uniform and having sufficient color rendering properties on a rectangular screen, and hence a short-arc type discharge lamp having a mercury vapor pressure of at least, for example, 150 atmospheres at the time of lighting is employed as a light source.

Therefore, recently, a projector apparatus having a dimming function capable of adjusting brightness of the screen according to the brightness of an usage environment or the type of the image to be projected has developed, and as a discharge lamp lighting apparatus used in such a projector apparatus, the one including a power supply apparatus configured to light a discharge lamp by switching the mode between a rated power lighting mode in which rated power is supplied to the discharge lamp and a low power lighting mode in which power lower than the rated power, for example, 80% of the rated power is supplied to the discharge lamp is known (see Japanese Patent No. 4274053 and corresponding U.S. Pat. No. 7,436,121).

However, in the discharge lamp lighting apparatus having such a structure, there is a problem that flicker may occur in the discharge lamp when switching from the rated power lighting mode to the low power lighting mode.

The reasons why the flicker occurs in the discharge lamp in the low power lighting mode when the mode is switched to the low power lighting mode in this manner seem to be as follows.

When the discharge lamp is lit by the rated power lighting mode, as illustrated in FIG. 14(a), arcs A are formed between a pair of the electrodes 90, 91 of the discharge lamp, and hence evaporated electrode substance is accumulated by a halogen cycle at positions where original points of the arcs A at distal ends of the electrodes 90, 91 are positioned, so that projections p1 according to the magnitude of the original points of the arcs A are formed.

Then, in a mode switching term in which the mode is switched from the rated power lighting mode to the low power lighting mode, as illustrated in FIG. 14(b), the shape of the arcs A formed between the electrodes 90, 91 becomes narrower as the value of power supplied to the discharge lamp is lowered, so that the evaporated electrode substance is accumulated at positions on surfaces of the projections p1 of the respective electrodes 90, 91 where the original points of the arcs A are positioned, whereby minute projections p2 are formed on the surfaces of the projections p1 of the respective electrodes 90, 91 as illustrated in FIG. 14(c).

Therefore, since the shape of the arcs A formed between the electrodes 90, 91 is abruptly narrowed in the mode switching term in which the power supplied to the discharge lamp is lowered, the arcs A formed between the electrodes 90, 91 become unstable by the movement of the original points on the surfaces of the projections p1 of the respective electrodes 90, 91 as illustrated by broken lines in FIG. 14(d) and, consequently, a plurality of the minute projections p2 are formed on the surfaces of the projections p1 of the respective electrodes 90, 91 as illustrated in FIG. 14(e).

In this manner, in a case where the discharge lamp is lit in the low power lighting mode in a state in which a plurality of the minute projections p2 are formed at the distal ends of the electrodes 90, 91, the original points of the arcs A move between the plurality of minute projections p2 and, consequently, flicker occurs in the discharge lamp.

In the discharge lamp lighting apparatus of the related art having the light-dimming function, there is a problem that the distal ends of the respective electrodes are worn in the low power lighting mode, and hence the flicker occurs.

The reason why the wearing of the distal ends of the electrodes and the flicker occur in the discharge lamp in such a low power lighting mode seems to be as follows.

When the discharge lamp is lit, the electrode substance is evaporated from the electrodes by generation of high-temperature heat of the electrodes. However, the electrode substance evaporated by the halogen cycle accumulates on the surfaces of the electrodes. Then, when the discharge lamp is lit in the rated power lighting mode, evaporation of the electrode substance from the electrodes and accumulation of the evaporated electrode substance on the electrodes are balanced, so that wearing of the electrodes is suppressed.

Therefore, when the discharge lamp is it in the low power lighting mode, the amount of the evaporated electrode substance existing in the periphery of the electrodes is significantly reduced, and hence the accumulation of the electrode substance with respect to the electrodes is not sufficiently achieved. Therefore, evaporation of the electrode substance from the electrodes progresses, and consequently, the distal ends of the electrodes are worn, and hence the flicker occurs.

SUMMARY OF THE INVENTION

The present invention is based on the circumstances as described above, and it is an object of the present invention to provide a discharge lamp lighting apparatus which is capable of preventing or suppressing occurrence of flicker while the discharge lamp is lit in a second lighting mode in which AC power lower than rated power is supplied when the mode is switched from a first lighting mode in which AC power of the rated power is supplied to the second lighting mode.

Another object of the present invention is to provide a discharge lamp lighting apparatus which is capable of preventing or suppressing occurrence of wearing of electrodes of the discharge lamp and occurrence of flicker when the discharge lamp is lit in the a low power lighting mode in which AC power lower than the rated power of the discharge lamp is supplied.

Solution of the Problem

The discharge lamp lighting apparatus according to the present invention is a discharge lamp lighting apparatus including: a discharge lamp having a pair of electrodes formed of tungsten formed respectively with projections at distal ends thereof, and a power supply apparatus configured to supply AC power to the discharge lamp, wherein the power supply apparatus has a function to light the discharge lamp by switching the mode between a first lighting mode in which rated power is supplied to the above-described discharge lamp and a second lighting mode in which power lower than the rated power is supplied to the discharge lamp, and is configured to control power to be supplied to the discharge lamp under the condition of an average power change ratio of 0.01 to 2.1 W/s in a mode switching term in which the mode is switched from the first lighting mode to the second lighting mode.

In the discharge lamp lighting apparatus described above, preferably, the power supply apparatus is configured to control the power to be supplied to the discharge lamp under the condition that the average power change ratio is equal to or lower than 2.1 W/s in the mode switching term in which the mode is switched from the second lighting mode to the first lighting mode. A configuration in which the power supply apparatus has a function to light the discharge lamp by switching the mode between the second lighting mode and a third lighting mode in which power lower than the supply power in the second lighting mode is supplied to the discharge lamp, and is configured to control the power to be supplied to the discharge lamp under the condition of an average power change ratio of 0.01 to 2.1 W/s in a mode switching term in which the mode is switched from the second lighting mode to the third lighting mode is also applicable.

In the discharge lamp lighting apparatus described above, the power supply apparatus is preferably configured to control the power to be supplied to the discharge lamp under the condition that the average power change ratio is equal to or lower than 2.1 W/s in the mode switching term in which the mode is switched from the third lighting mode to the second lighting mode.

Also, the discharge lamp lighting apparatus according to the present invention is a discharge lamp lighting apparatus including: a discharge lamp having a pair of electrodes formed respectively with projections at distal ends thereof; and a power supply apparatus configured to supply AC power to the discharge lamp, wherein the power supply apparatus has a function to light the discharge lamp by switching the mode between a first lighting mode in which rated power is supplied to the above-described discharge lamp and a second lighting mode in which power lower than the rated power is supplied to the discharge lamp, and is configured to control the power to be supplied to the discharge lamp under the condition including the power change such that the power is lowered from a given power value P1 equal to or lower than the supply power in the first lighting mode and equal to or higher than the supply power in the second lighting mode to a power value P2 lower than the power value P1, and then is increased from the power value P2 to a power value P3 higher than the power value P2 and lower than the power value P1 in the mode switching term in which the mode is switched from the first lighting mode to the second lighting mode.

In the discharge lamp lighting apparatus described above, preferably, the power supply apparatus is configured to control the power to be supplied to the discharge lamp under the condition including twice or more power changes in which the power value is lowered from the power value P1 to the power value P2 lower than the power value P1, and then the power value is increased from the power value P2 to the power value P3 higher than the power value P2 and lower than the power value P1 in the mode switching term in which the mode is switched from the first lighting mode to the second lighting mode.

Also, the power supply apparatus may have a function to light the discharge lamp by switching the mode between the above-described second lighting mode and a third lighting mode in which power lower than the supply power in the second lighting mode is supplied to the discharge lamp, and be configured to control the power to be supplied to the discharge lamp under the condition including the power change such that the power value is lowered from a given power value P1 equal to or lower than the supply power in the first lighting mode and equal to or higher than the supply power in the second lighting mode to the power value P2 lower than the power value P1, and then is increased from the power value P2 to a power value P3 higher than the power value P2 and lower than the power value P1 in the mode switching term in which the mode is switched from the second lighting mode to the third lighting mode.

In the discharge lamp lighting apparatus described above, preferably, the power supply apparatus is configured to control the power to be supplied to the discharge lamp under the condition including twice or more power changes in which the power value is lowered from the power value P1 to the power value P2 lower than the power value P1, and then the power value is increased from the power value P2 to the power value P3 higher than the power value P2 and lower than the power value P1 in the mode switching term in which the mode is switched from the second lighting mode to the third lighting mode.

Also, the discharge lamp lighting apparatus according to the present invention is a discharge lamp lighting apparatus including: a discharge lamp; and a power supply apparatus configured to supply AC power to the discharge lamp, wherein the power supply apparatus has a function to light the discharge lamp by switching the mode between a rated power lighting mode in which rated power is supplied to the discharge lamp and a low power lighting mode in which power lower than the rated power is supplied to the discharge lamp, and is configured to supply basic AC power having a predetermined power value continuously to the discharge lamp, and supply superimposed power superimposed on this basic AC power cyclically, and simultaneously, controls the supply timing of the superimposed power, the power value of the superimposed power, or the supply time of the superimposed power according to a measured value of lighting voltage of the discharge lamp in the low power lighting mode.

In the discharge lamp lighting apparatus, preferably, the power supply apparatus is configured to control the supply timing of the superimposed power so as to supply the superimposed power to the discharge lamp at a shorter time interval when the measured value of the lighting voltage of the discharge lamp is higher than a predetermined reference value than when the measured value is lower than the predetermined reference value in the low power lighting mode.

Also, preferably, the power supply apparatus is configured to control the power value of the superimposed power so as to supply the superimposed power to the discharge lamp at a higher power value when the measured value of the lighting voltage of the discharge lamp is higher than the predetermined reference value than when the measured value is lower than the predetermined reference value in the low power lighting mode.

Also, preferably, the power supply apparatus is configured to control the supply time of the superimposed power so as to supply the superimposed power to the discharge lamp in a longer time when the measured value of the lighting voltage of the discharge lamp is higher than the predetermined reference value than when the measured value is lower than the predetermined reference value in the low power lighting mode.

The measured value of the lighting voltage of the discharge lamp may be measured either when the superimposed power is not supplied or when the superimposed power is supplied.

Advantageous Effects of Invention

According to a feature of the discharge lamp lighting apparatus of the invention, the power supply apparatus controls the power to be supplied to the discharge lamp under the condition in which the average power change ratio becomes 0.01 to 2.1 W/s in the mode switching term in which the mode is switched from the first lighting mode to the second lighting mode, whereby the original points of the arcs do not move along the surfaces of the projections of the respective electrodes and the stable arcs are formed, so that a plurality of minute projections are not formed on the surfaces of the projections of the respective electrodes, and hence occurrence of flicker may be prevented or suppressed while the discharge lamp is lit in the second lighting mode when the mode is switched from the first lighting mode to the second lighting mode.

According to another a feature of the discharge lamp lighting apparatus of the invention, the power supply apparatus controls the power to be supplied to the discharge lamp under the condition that the average power change ratio is equal to or lower than 2.1 W/s in the mode switching term in which the mode is switched from the second lighting mode to the first lighting mode, so that occurrence of cracks in the light-emitting tube of the discharge lamp may be prevented of suppressed.

According to a further a feature of the discharge lamp lighting apparatus of the invention, since the AC power to be supplied to the discharge lamp is controlled under the condition including the power change in which the power value is lowered from the power value P1 to the power value P2, then is increased from the power value P2 to the power value P3 higher than the power value P2 and lower than the power value P1 in the mode switching term in which the mode is switched from the first lighting mode to the second lighting mode, even when a plurality of the minute projections are formed on the surfaces of the projections of the electrodes when the AC power to be supplied to the discharge lamp is lowered from the power value P1 to the power value P2, a plurality of the minute projections are converged into one minute projection, whereby the electrodes are repaired when the AC power to be supplied to the discharge lamp is increased from the power value P2 to the power value P3, so that the occurrence of flicker may be prevented or suppressed while the discharge lamp is lit in the second lighting mode.

According to yet another a feature of the discharge lamp lighting apparatus of the invention, the power supply apparatus supplies the superimposed power which is superimposed on the basic AC power of the predetermined power value cyclically to the discharge lamp, and controls the supply timing of the superimposed power, the power value of the superimposed power, or the supply time of the superimposed power in the low power lighting mode in which power lower than the rated power is supplied to the discharge lamp, so that the amount of the evaporated electrode substance existing in the periphery of the electrodes is increased, whereby accumulation of the evaporated electrode substance on the electrodes of the discharge lamp is accelerated, and hence occurrence of wearing of the electrodes of the discharge lamp and flicker may be prevented or suppressed.

DETAILED DESCRIPTION OF THE INVENTION

Embodiments of a discharge lamp lighting apparatus of the present invention will be described below.

The discharge lamp lighting apparatus of the present invention is configured to be integrated, for example, in a projector apparatus having a dimming function, and includes a discharge lamp and a power supply apparatus configured to supply AC power to the discharge lamp.

Figure 1:
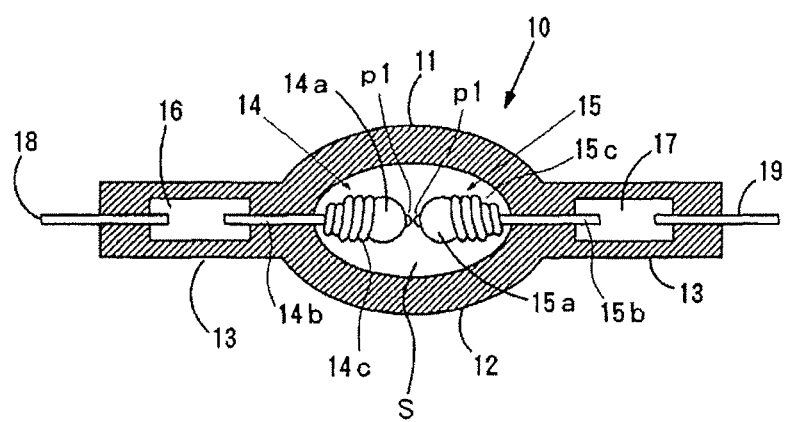
FIG. 1 is a cross-sectional view illustrating a configuration of an example of a discharge lamp used in a discharge lamp lighting apparatus of the present invention.

FIG. 1 is an explanatory cross-sectional view illustrating a configuration of an example of the discharge lamp used in the discharge lamp lighting apparatus of the present invention.

A light-emitting tube 11 of this discharge lamp 10 includes a light-emitting portion 12 having an outline which defines a discharge space S in an interior thereof and has a substantially oval spherical shape, and sealed portions 13 extending continuously and integrally with both ends of the light-emitting portion 12 respectively and having a rod shape extending outward along a tube axis, and a pair of electrodes 14, 15 formed respectively of tungsten arranged in the interior of the light-emitting portion 12 of the light-emitting tube 11 so as to face each other. Specifically, a pair of the electrodes 14, 15 include rod-shaped shaft portions 14b, 15b extending along the direction toward the tube axis of the light-emitting tube 11, substantially spherical head portions 14a, 15a formed continuously from respective distal ends of the shaft portions 14b, 15b and formed with projections p1 at distal ends thereof, and coil portions 14c, 15c wound around rear end portions of the head portions 14a, 15a and distal end portions of the shaft portions 14b, 15b, and the respective head portions 14a, 15a thereof are arranged so as to face each other, and proximal portions of the respective shaft portions 14b, 15b are held by being embedded in the respective sealed portions 13.

Metal foils 16, 17 formed of molybdenum are hermetically embedded in interiors of the respective sealed portions 13 of the light-emitting tube 11, and proximal ends of the shaft portions 14b, 15b of a pair of the electrodes 14, 15 are respectively welded and electrically connected to one of ends of each of the metal foils 16, 17, and external leads 18, 19 projecting outward from outer ends of the sealed portions 13 are welded and electrically connected to the other ends of the metal foils 16, 17.

The light-emitting tube 11 is formed of quartz glass, and for example, mercury, noble gas, and halogen are enclosed in the interior of the light-emitting portion 12 of the light-emitting tube 11.

The mercury to be enclosed in the interior of the light-emitting portion 12 is for obtaining a required visible light wavelength, for example, radiant light having a wavelength of 360 to 780 nm, and the enclosed amount thereof is determined to be not lower than 0.15 mg/mm$^3$ in order to secure a high mercury vapor pressure not lower than 150 atmospheres, for example, at the time of lighting, and a high mercury vapor pressure not lower than 200 or 300 atmosphere may be obtained at the time of lighting by increasing the amount of enclosure of the mercury, so that a light source suitable for the projector apparatus may be realized.

The noble gas to be enclosed in the interior of the light-emitting portion 12 is for improving a lighting startability, and the enclosing pressure thereof is, for example, 10 to 26 kPa at static pressure. As the noble gas, argon gas may be preferably used.

The halogen enclosed in the interior of the light-emitting portion 12 is for forming halogen cycle in the interior of the light-emitting portion 12, thereby suppressing tungsten as electrode substance from being adhered to an inner wall of the light-emitting portion 12, and is enclosed in a form of a compound including mercury and other metals. The amount of enclosure of halogen is, for example, $1 \times 10^{-6}$ to $1 \times 10^{-2}$ μmol/mm$^3$. Iodine, bromine, chlorine, and so on may be used as halogen.

In the interior of the light-emitting portion 12, metal halide may be enclosed as still another charging medium.

To give a specific example of specifications of the discharge lamp 10 as described above, the maximum outer diameter of the light-emitting portion 12 of the light-emitting tube 11 is 10 mm and an inter-electrode distance of the same is 1.0 mm, an internal volume of the light-emitting portion 12 of the light-emitting tube 11 is 60 mm$^3$, a rated voltage of the same is 75V, and a rated power of the same is 200 W.

In the discharge lamp 10, a mercury vapor pressure in the interior of the light-emitting portion 12 of the light-emitting tube 11 while it is lit becomes, for example, not lower than 150 atmospheres, and in the projector apparatus in which the discharge lamp lighting apparatus is integrated therein, miniaturization of the entire apparatus is conducted, while a high light quantity is required, and hence the thermal condition in the interior of the light-emitting portion 12 of the light-emitting tube 11 of the discharge lamp 10 is quite strict, so that a bulb wall loading value of the lamp is, for example, 0.8 to 3.0 W/mm$^2$ and, more in detail, 2.0 W/mm$^2$.

By having such a high mercury vapor pressure or a bulb wall loading value, radiant light having preferable color rendering properties may be obtained in the case of being used as the light source of the projector apparatus.

In the discharge lamp lighting apparatus according to a first embodiment, the power supply apparatus has a function to light the discharge lamp 10 by switching the mode between a first lighting mode in which rated power is supplied to the above-described discharge lamp 10 and a second lighting mode in which power lower than the rated power is supplied to the discharge lamp 10, and is configured to control power to be supplied to the discharge lamp under the condition of an average power change ratio of 0.01 to 2.1 W/s, preferably, 0.08 to 0.77 W/s in a mode switching term in which the mode is switched from the first lighting mode to the second lighting mode.

Here, the power value to be supplied to the discharge lamp 10 in the second lighting mode is not specifically limited as long as being lower than the value of the rated power, and is selected normally within a range from 40 to 80% of the rated power. If the average power change ratio lower than 0.01 W/s in the mode switching term in which the mode is switched from the first lighting mode to the second lighting mode, lowering of the power to be supplied is continued for a long time, so that blacking of the light-emitting tube 11 of the discharge lamp 10 may result. In contrast, if the average power change ratio exceeds 2.1 W/s, the lowering of the power to be supplied brings about abruptly in a short time, so that the flicker may occur while the discharge lamp 10 is lit in the second lighting mode after the mode switching term.

Also, the power supply apparatus is preferably configured to control the power to be supplied to the discharge lamp 10 under the condition that the average power change ratio is equal to or lower than 2.1 W/s in a mode switching term in which the mode is switched from the second lighting mode to the first lighting mode.

If the average power change ratio exceeds 2.1 W/s in the mode switching term in which the mode is switched from the second lighting mode to the first lighting mode, increase of the power to be supplied brings about abruptly in a short time, so that cracking of the light-emitting tube 11 of the discharge lamp 10 may result.

Although the lower limit of the average power change ratio is not specifically limited in the mode switching term in which the mode is switched from the second lighting mode to the first lighting mode, the time required for switching the mode is increased as lowering of the average power change ratio, so that the average power change ratio is preferably not lower than 0.01 W/s.

Figure 2:
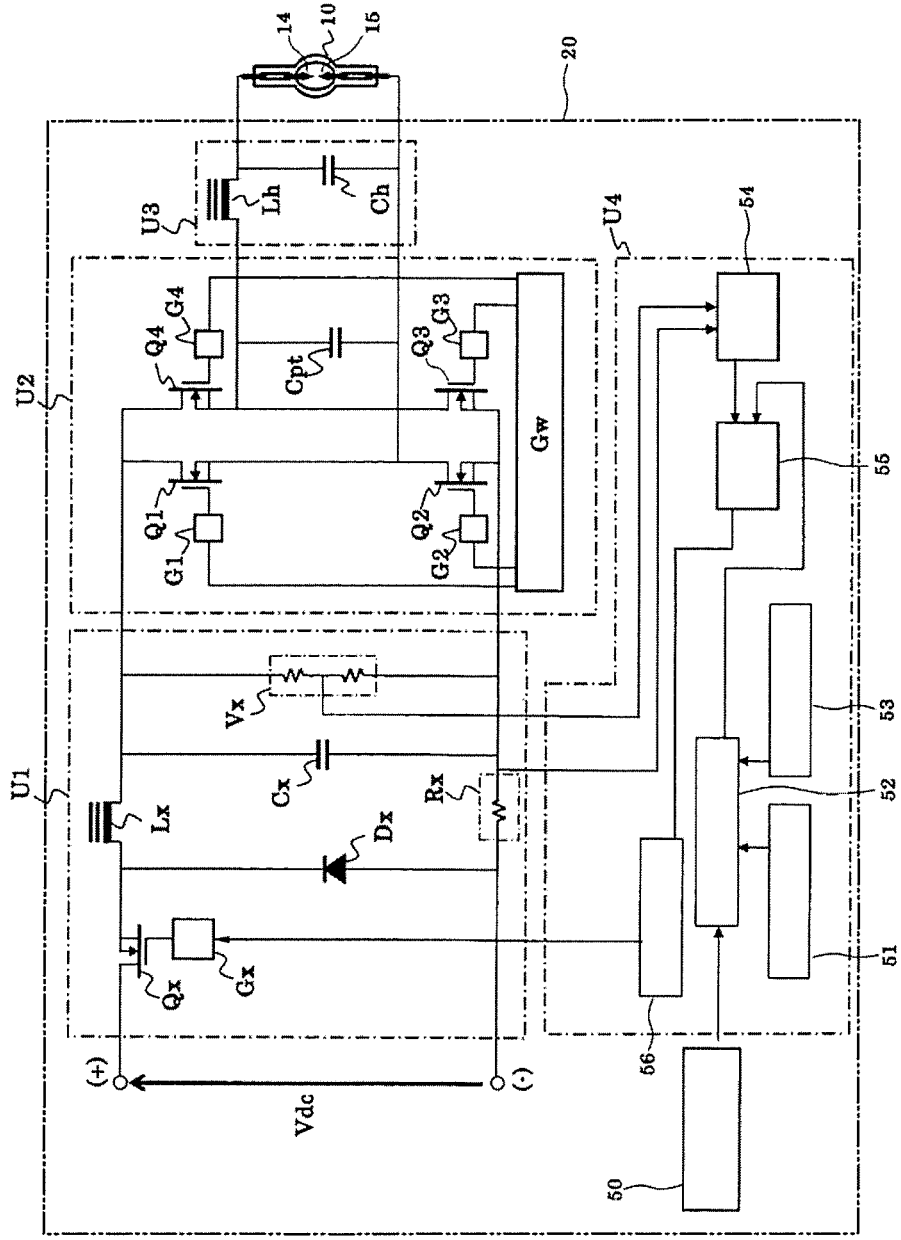
FIG. 2 is an explanatory drawing illustrating a configuration of an example of a circuit of a power supply apparatus used in a discharge lamp lighting apparatus according to a first embodiment.

FIG. 2 is an explanatory drawing illustrating a configuration of an example of a circuit of a power supply apparatus used in the discharge lamp lighting apparatus according to the first embodiment. A power supply apparatus 20 includes a chopper circuit U1, a full bridge circuit U2, a starter circuit U3, and a control unit U4.

The chopper circuit U1 includes a switching element Qx connected to a plus-side power source terminal to which a direct current voltage Vdc is supplied, a reactor Lx, a diode Dx whose cathode-side terminal is connected to a connecting point between the switching element Qx and the reactor Lx at a position between the connecting point and a minus-side power source terminal, a smoothing capacitor Cx connected to an output-side terminal of the reactor Lx, and a current detecting unit Rx connected to a one-side terminal of the smoothing capacitor Cx and an anode-side terminal of the diode Dx. The switching element Qx is configured to be driven by a drive circuit Gx operated on the basis of a signal output from the control unit U4, and turned ON/OFF by a predetermined duty, and the power to be supplied to the discharge lamp 10 is controlled by the duty.

The full bridge circuit U2 includes four switching elements Q1 to Q4 connected in a bridge pattern. The switching elements Q1 to Q4 are driven by drive circuits G1 to G4 corresponding to the respective switching elements Q1 to Q4 being operated on the basis of a signal output from a full bridge control circuit Gw, and a square wave-shaped AC voltage is generated between a connecting point between the switching elements Q1, Q2 and a connecting point between the switching elements Q3, Q4 by turning the switching elements Q1, Q4 and the switching elements Q2, Q3 arranged at opposing corners in an ON state alternately.

The starter circuit U3 includes a coil Lh and a capacitor Ch. In the starter circuit U3 configured as described above, a resonant frequency of a resonant circuit of the coil Lh and the capacitor Ch is output from the full bridge circuit U2, so that a high voltage may be generated from the capacitor Ch by a resonant effect thereof. Therefore, the starter circuit U3 is operated at a high frequency only at the time of starting of the discharge lamp 10, whereby a high voltage is applied between a pair of the electrodes of the discharge lamp 10 and the discharge lamp 10 is lit.

In the power supply apparatus 20 as described above, the power to be supplied to the discharge lamp 10 is set by ON/OFF duty of the switching element Qx of the chopper circuit U1. The switching element Qx of the chopper circuit U1 is turned ON and OFF by a predetermined duty of the drive circuit Gx on the basis of the signal output from the control unit U4, whereby the power to be supplied to the discharge lamp 10 is adjusted. When the power value to be supplied to the discharge lamp 10 is increased for example, the power value to be supplied to the discharge lamp 10 is controlled by the drive circuit Gx so as to match a preset reference voltage value by lowering the duty or the like.

In this manner, the control unit U4 has a function to control the power value to be supplied to the discharge lamp 10 so as to match the reference power value, and has a function to change the power value to be supplied to the discharge lamp 10 not instantaneously, but at a predetermined power change ratio when changing the lighting mode of the discharge lamp 10 at the time of being steadily lit.

More specifically, a predetermined power value is set to a power setting unit 50 in the control unit U4. For example, a rated power value is set to the power setting unit 50 when the discharge lamp 10 is lit in the first lighting mode, and a power value lower than the rated power value is set to the power setting unit 50 when the discharge lamp 10 is lit in the second lighting mode. The power setting unit 50 may be provided in an interior of the power supply apparatus 20 or on the outside of the power supply apparatus 20, for example, in the interiors of an apparatuses other than the discharge lamp lighting apparatus in the projector apparatus.

A power change ratio when changing the power in the power setting unit 50 is set in a power change ratio setting unit 51.

A set power signal from the power setting unit 50, a change ratio signal from the power change ratio setting unit 51, and a time signal from a timer circuit 53 are input to a reference power setting unit 52, and a reference power signal which is changed with elapsed time is output on the basis of these signals. For example, when the rated power value is initially set in the power setting unit 50 and a low power value lower than the rated power value is set at a certain time point, in the reference power setting unit 52, the reference power value is changed from the rated power value to the low power value while receiving the time signal from the timer circuit 53 on the basis of the power change ratio set in the power change ratio setting unit 51. For example, when the rated power value is 230 W, the low power value is 180 W, and the power change ratio is 2.00 W/s, the reference power value is changed from the rated power value (230 W) to the low power value (180 W) by spending 25 seconds, and subsequently, the reference power setting unit 52 outputs a reference power signal having the low power value (180 W) unless otherwise a new power value is set in the power setting unit 50.

Signals from a voltage detecting unit Vx and the current detecting unit Rx are input to a power calculating circuit 54, and a power value of a lighting power is calculated on the basis of these signals, the obtained lighting power signal is input to a comparing unit 55, and in this comparing unit 55, the lighting power signal is compared with the reference power signal from the power setting unit 50. The signal output from the comparing unit 55 is input to the drive circuit Gx of the switching element Qx via a PWM circuit 56.

The full bridge circuit U2 contributes to a lighting frequency of the discharge lamp 10 as described above, and the respective drive circuits G1 to G4 are driven so as to achieve the frequency set in the full bridge circuit U2.

In the discharge lamp lighting apparatus according to the first embodiment, the discharge lamp 10 is lit by the supply of the AC power from the power supply apparatus 20 to the discharge lamp 10, and the power to be supplied to the discharge lamp 10 by the power supply apparatus 20 is controlled, for example, as described below.

Figures 3, 4:
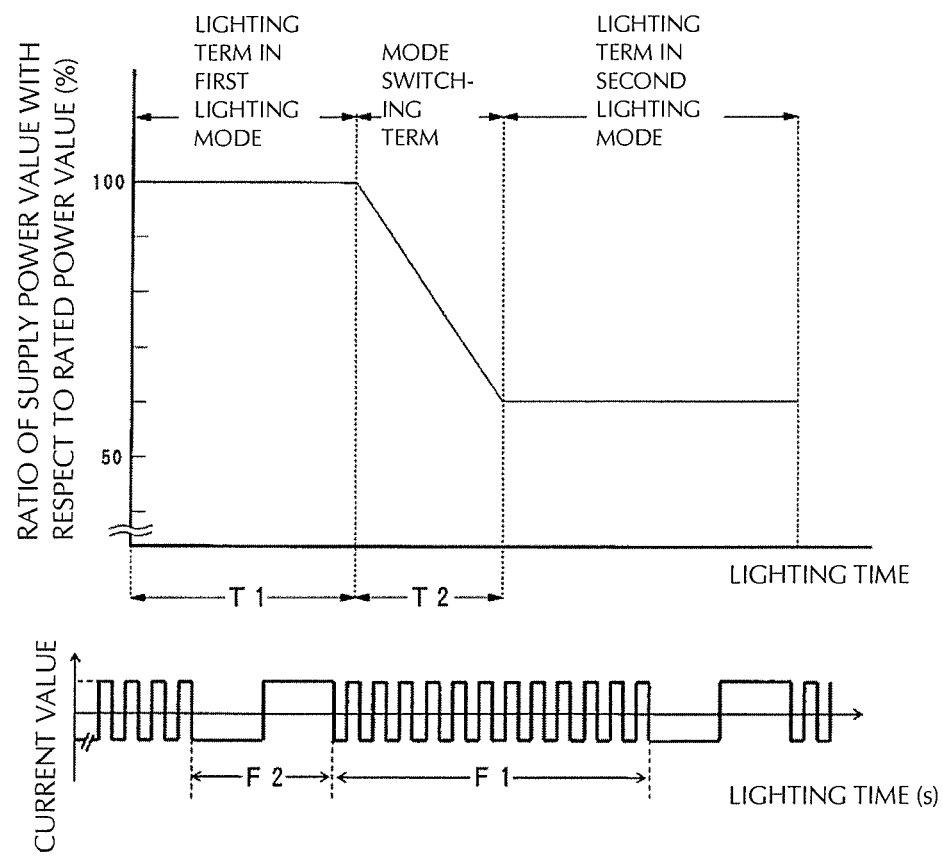
FIG. 3 is a graph illustrating an example of a change of value of power supplied to the discharge lamp in a case where the mode is switched from a first lighting mode to a second lighting mode in the discharge lamp lighting apparatus according to the first embodiment.
FIG. 4 is an explanatory drawing illustrating an example of a current waveform of AC power to be supplied to the discharge lamp in the discharge lamp lighting apparatus according to the first embodiment.

FIG. 3 is a graph illustrating an example of a change of value of power supplied to the discharge lamp in a case where the mode is switched from the first lighting mode to the second lighting mode in the discharge lamp lighting apparatus according to the first embodiment. In this graph, the vertical axis indicates a ratio of the power value to be actually supplied to the discharge lamp 10 with respect to the rated power value of the discharge lamp 10 (the ratio of the supply power value assuming that the rated power value is determined to be 100%), and the lateral axis indicates a lighting time of the discharge lamp 10.

First of all, when the power supply apparatus 20 is driven in a state in which the first lighting mode is selected as the lighting mode, power in the first lighting mode, specifically, AC power having a power value corresponding to the rated power of the discharge lamp 10 is supplied from the power supply apparatus 20 to the discharge lamp 10, whereby the discharge lamp 10 is lit. Subsequently, if the lighting mode is changed from the first lighting mode to the second lighting mode in the power supply apparatus 20 when a time T1 is elapsed since the lighting of the discharge lamp 10 in the first lighting mode is started, the power value of the AC power to be supplied from the power supply apparatus 20 is lowered at a predetermined average power change ratio selected from a range of 0.01 to 2.1 W/s in the mode switching term in which the mode is switched from the first lighting mode to the second lighting mode, and when a time T2 is elapsed from the change of the lighting mode from the first lighting mode to the second lighting mode, the power value of AC power to be supplied to the discharge lamp 10 reaches the power value of the power in the second lighting mode, and the lighting of the discharge lamp 10 in the second lighting mode is started.

Here, to give a detailed example of the length of the mode switching term, that is, the time T2 taken until the power value supplied to the discharge lamp 10 is lowered from the value of the supply power in the first lighting mode to the value of the supply power in the second lighting mode, T2=(200 W−120 W)÷2.0 W/s=40 s is satisfied, where a rated power value of the discharge lamp 10 is 200 W, the value of the supply power in the second lighting mode is 120 W (60% of the rated power), and the average power change ratio in the mode switching term is 2.0 W/s, for example.

Also, when the lighting mode is changed from the second lighting mode to the first lighting mode in the power supply apparatus 20, the power value of the AC power to be supplied from the power supply apparatus 20 is increased at the predetermined average power change ratio equal to or lower than 2.1 W/s in the mode switching term in which the mode is switched from the second lighting mode to the first lighting mode, and subsequently, the power value of the AC power to be supplied to the discharge lamp 10 reaches the power value of the power in the first lighting mode, and the lighting of the discharge lamp 10 in the first lighting mode is started.

In the description given above, a current waveform of the AC power to be supplied to the discharge lamp 10 preferably has a form in which a low-frequency component having a frequency lower than a basic frequency component is cyclically inserted into the basic frequency component.

An example of the current waveform of the AC power to be supplied to the discharge lamp 10 will be illustrated in FIG. 4. In this drawing, the vertical axis indicates the current power value of the power to be supplied to the discharge lamp 10, and the lateral axis indicates the lighting time of the discharge lamp 10. In this current waveform, a low-frequency component F2 having a frequency lower than the basic frequency component is cyclically inserted into a basic frequency component F1.

The frequency of the basic frequency component F1 is selected, for example, from a range from 60 to 1000 Hz. In contrast, the frequency of the low-frequency component F2 is a frequency lower than the frequency of the basic frequency component F1, and is selected, for example, from a range from 5 to 200 Hz.

The low-frequency component F2 may have a length of half a cycle, and an insertion interval of the low-frequency component F2 (the time interval from when a certain low frequency component is inserted until when the next low-frequency component is inserted) is preferably not more than 120 seconds and, more preferably, from 0.01 to 120 seconds. Specific frequencies of the basic frequency component F1 and the low-frequency component F2, an insertion interval of the low-frequency component F2, and the amplitude of the low-frequency component F2 are selected as needed by considering the design of the discharge lamp 10 to be used, specifically, a relation with respect to a thermal design of the electrodes 14, 15 or the values of the power in the respective lighting modes or the like.

To give a specific example of the current waveform, the frequency of the basic frequency component F1 is 370 Hz, the length of the one basic frequency component F1 is 37.5 cycle, the frequency of the low-frequency component F2 is 90 Hz, and the length of the one low-frequency component F2 is 1 cycle.

Figure 5A:
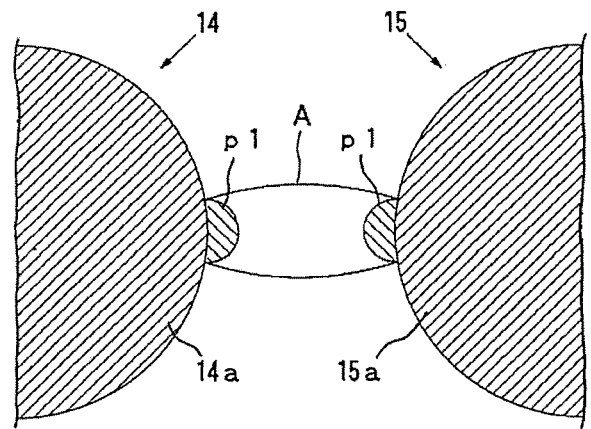
FIGS. 5(a)-5(c) are explanatory views illustrating electrodes and a change of the shape of arcs of the discharge lamp in a mode switching term in which the mode is switched from the first lighting mode to the second lighting mode in the discharge lamp lighting apparatus according to the first embodiment.
Figure 5B:
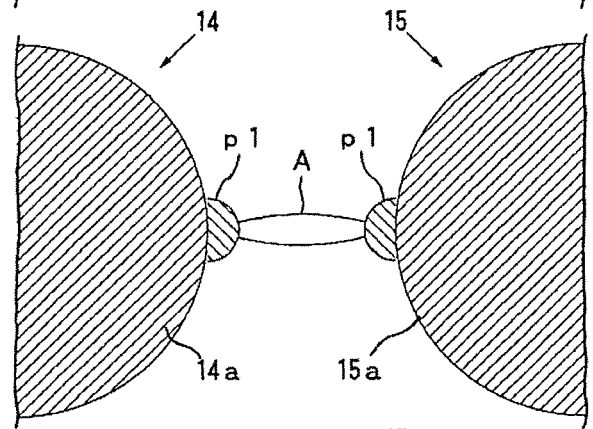
Figure 5C:
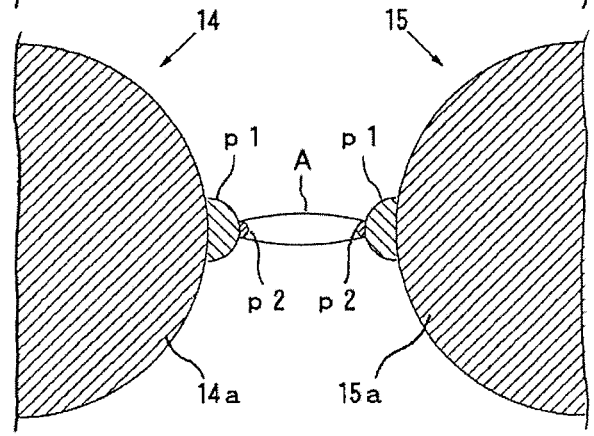

In the discharge lamp lighting apparatus according to the first embodiment, when the power in the first lighting mode is supplied from the power supply apparatus 20 to the discharge lamp 10, arcs A are formed between a pair of the electrodes 14, 15 of the discharge lamp 10 as the projections p1 formed at the distal ends of the head portions 14a, 15a of the respective electrodes 14, 15 as original points as illustrated in FIG. 5(a). Then, in the mode switching term in which the mode is switched from the first lighting mode to the second lighting mode, as illustrated in FIG. 5(b), the shape of the arcs A formed between the electrodes 14, 15 becomes narrower as the value of power supplied to the discharge lamp is lowered, so that the evaporated electrode substance is accumulated at positions on surfaces of the projections p1 of the respective electrodes 14, 15 where the original points of the arcs A are positioned by a halogen cycle, whereby minute projections p2 are formed on the surfaces of the projections p1 on the respective electrodes 14, 15 as illustrated in FIG. 5(c).

Therefore, according to the discharge lamp lighting apparatus of the first embodiment, the power to be supplied to the discharge lamp 10 is controlled by the power supply apparatus 20 under the condition in which the average power change ratio becomes a value from 0.01 to 2.1 W/s in the mode switching term in which the mode is switched from the first lighting mode to the second lighting mode, whereby the original points of the arcs A do not move on the surfaces of the projections p1 of the respective electrodes 14, 15, and the stable arcs A are formed, so that a plurality of the minute projections p2 are not formed on the surfaces of the projections p1 on the respective electrodes 14, 15, and hence occurrence of the flicker may be prevented or suppressed while the discharge lamp 10 is lit in the second lighting mode.

In the discharge lamp lighting apparatus according to a second embodiment, the power supply apparatus has a function to light the discharge lamp 10 by switching the mode between the first lighting mode in which rated power is supplied to the above-described discharge lamp 10 and the second lighting mode in which the power lower than the rated power is supplied to the discharge lamp 10, and is configured to control the power to be supplied to the discharge lamp 10 under the condition including the power change such that the power value is lowered from a given power value P1 equal to or lower than the supply power in the first lighting mode and equal to or higher than the supply power in the second lighting mode to a power value P2 lower than the power value P1 in the mode switching term in which the mode is switched from the first lighting mode to the second lighting mode, and then is increased from the power value P2 to a power value P3 higher than the power value P2 and lower than the power value P1 (hereinafter, referred to as "specific power change"). Here, the power value to be supplied to the discharge lamp 10 in the second lighting mode is not specifically limited as long as being lower than the value of the rated power, and is selected normally within a range from 40 to 80% of the rated power.

Although the specific power change has only to be performed at least once in the mode switching term in which the mode is switched from the first lighting mode to the second lighting mode, it is preferably performed twice or more. In particular, when the difference in power value between the supply power in the first lighting mode and the supply power in the second lighting mode is significant, it is preferably performed three times or more little by little.

In the specific power change, the power value P1 may be determined arbitrarily without being specifically limited as long as being values equal to and lower than the supply power in the first lighting mode and equal to and higher than the supply power in the second lighting mode. The power value P2 has only to be a value lower than the power value P1, and may be a value lower than the supply power in the second lighting mode, for example. However, a difference (P1−P2) between the power value P1 and the power value P2 is preferably on the order of 5 to 50% of the power value of the supply power in the first lighting mode.

The power value P3 has only to be a value higher than the power value P2 and lower than the power value P1, and a difference (P3-P2) between the power value P3 and the power value P2 is preferably on the order of 2 to 50% of the difference (P1-P2) between the power value P1 and the power value P2.

When the specific power change is performed twice or more, the last specific power change is preferably the power change which is lowered from the power value P1 to the power value P2 which is a lower value than the supply power in the second lighting mode and then is increased to the power value P2 which corresponds to the supply power in the second lighting mode.

Also, the average power change ratio when the power value to be supplied to the discharge lamp 10 is lowered from the power value P1 to the power value P2 is preferably from 0.1 to 10 W/s.

Also, the average power change ratio when the power value to be supplied to the discharge lamp 10 is increased from the power value P2 to the power value P3 is preferably from 0.1 to 10 W/s.

In the discharge lamp lighting apparatus according to the second embodiment, the discharge lamp 10 is lit by the supply of the AC power from the power supply apparatus to the discharge lamp 10, and the power value to be supplied to the discharge lamp 10 by the power supply apparatus is controlled, for example, as described below.

Figure 6:
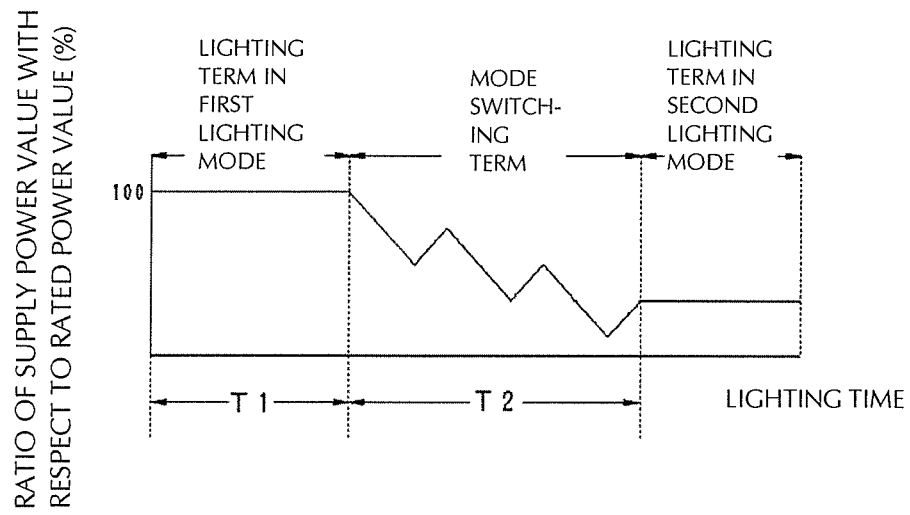
FIG. 6 is a graph illustrating an example of a change of value of power supplied to the discharge lamp in the case where the mode is switched from the first lighting mode to the second lighting mode in a discharge lamp lighting apparatus according to a second embodiment.

FIG. 6 is a graph illustrating an example of the change of value of power supplied to the discharge lamp in the case where the mode is switched from the first lighting mode to the second lighting mode in the discharge lamp lighting apparatus according to the second embodiment. In this graph, the vertical axis indicates a ratio of the power value to be actually supplied to the discharge lamp 10 with respect to the rated power value of the discharge lamp 10 (the ratio of the supply power value assuming that the rated power value is determined to be 100%), and the lateral axis indicates the lighting time of the discharge lamp 10.

First of all, when the power supply apparatus is driven in a state in which the first lighting mode is selected as the lighting mode, power in the first lighting mode, specifically, AC power having a power value corresponding to the rated power of the discharge lamp 10 is supplied from the power supply apparatus to the discharge lamp 10, whereby the discharge lamp 10 is lit. Subsequently, if the lighting mode is changed from the first lighting mode to the second lighting mode in the power supply apparatus when the time T1 is elapsed since the lighting of the discharge lamp 10 in the first lighting mode is started, the power to be supplied to the discharge lamp 10 is lowered while performing the power change such that the power value is lowered from the given power value P1 which is lower than the supply power in the first lighting mode and equal to or higher than the supply power in the second lighting mode to the power value P2 lower than the power value P1, and then, is increased from the power value P2 to the power value P3 higher than the power value P2 and lower than the power value P1 in the mode switching term in which the mode is switched from the first lighting mode to the second lighting mode, and when the time T2 is elapsed since the change of the lighting mode from the first lighting mode to the second lighting mode, the power value of AC power to be supplied to the discharge lamp 10 reaches the power value of the power in the second lighting mode, and the lighting of the discharge lamp 10 in the second lighting mode is started.

In the description given above, the current waveform of the AC power to be supplied to the discharge lamp 10 is preferably a form in which a low-frequency component having a lower frequency than a basic frequency component is cyclically inserted into the basic frequency component.

As an example the current waveform of the AC power supplied to the discharge lamp 10, the one exemplified in conjunction with the discharge lamp lighting apparatus according to the first embodiment, that is, those illustrated in FIG. 4 may be presented.

The frequency of the basic frequency component F1 is selected, for example, from a range from 60 to 1000 Hz. In contrast, the frequency of the low-frequency component F2 is the frequency lower than the frequency of the basic frequency component F1, and is selected, for example, from a range from 5 to 200 Hz.

The low-frequency component may have a length of half a cycle, and an insertion interval of the low-frequency component (the time interval from when a certain low frequency component is inserted until when the next low-frequency component is inserted) is preferably not more than 120 seconds and, more preferably, from 0.01 to 120 seconds.

Specific frequencies of the basic frequency component F1 and the low-frequency component F2, an insertion interval of the low-frequency component F2, and the amplitude of the low-frequency component F2 are selected as needed by considering the design of the discharge lamp 10 to be used, specifically, the relation with respect to the thermal design of the electrodes 14, 15 or the values of the power in the respective lighting modes and the like.

To give a specific example of the current waveform, the frequency of the basic frequency component F1 is 370 Hz, the length of the one basic frequency component F1 is 37.5 cycle, the frequency of the low-frequency component F2 is 90 Hz, and the length of the one low-frequency component F2 is 1 cycle.

In the discharge lamp lighting apparatus according to the second embodiment, when the power in the first lighting mode is supplied from the power supply apparatus to the discharge lamp 10, the arcs A are formed between a pair of the electrodes 14, 15 of the discharge lamp 10 as the projections p1 formed at the distal ends of the head portions 14a, 15a of the respective electrodes 14, 15 as original points as illustrated in FIG. 7(a).

Figure 7G:
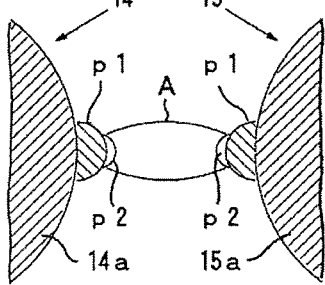
FIGS. 7(a)-7(f) are explanatory views illustrating electrodes and a change of the shape of arcs of the discharge lamp in the mode switching term in which the mode is switched from the first lighting to the second lighting mode in the discharge lamp lighting apparatus according to the second embodiment.

Then, in the mode switching term in which the mode is switched from the first lighting mode to the second lighting mode, when the power to be supplied to the discharge lamp 10 is lowered from the power value P1 to the power value P2, as illustrated in FIG. 7(b), the shape of the arcs A formed between the electrodes 14, 15 becomes narrower, so that the evaporated electrode substance is accumulated at positions on the surfaces of the projections p1 of the respective electrodes 14, 15 where the original points of the arcs A are positioned by the halogen cycle, whereby the minute projections p2 are formed on the surfaces of the projections p1 of the respective electrodes 14, 15 as illustrated in FIG. 7(c). At this time, since the shape of the arcs A formed between the electrodes 14, 15 is abruptly narrowed, the arcs A formed between the electrodes 14, 15 become unstable by the movement of the original points on the surfaces of the projections p1 of the respective electrodes 14, 15 as illustrated in FIG. 7(d) and, consequently, a plurality of the minute projections p2 are formed on the surfaces of the projections p1 of the respective electrodes 14, 15 as illustrated in FIG. 7(e). Therefore, when the power to be supplied to the discharge lamp 10 is increased from the power value P2 to the power value P3, as illustrated in FIG. 7(f), the shape of the arcs A formed between the electrodes 14, 15 becomes thicker and a plurality of the minute projections p2 are melted, whereby the minute projections p2 converge into one as illustrated in FIG. 7(g).

In this manner, according to the discharge lamp lighting apparatus of the second embodiment, since the AC power to be supplied to the discharge lamp 10 is controlled after lowering from the power value P1 to the power value P2 under the condition including the power change increased from the power value P2 to the power value P3 higher than the power value P2 and lower than the power value P1 in the mode switching term in which the mode is switched from the first lighting mode to the second lighting mode, even though a plurality of the minute projections p2 are formed on the surfaces of the projections p1 of the electrodes 14, 15 when the AC power to be supplied to the discharge lamp 10 is lowered from the power value P1 to the power value P2, a plurality of the minute projections p2 are converged into one minute projection p2 and the electrodes 14, 15 are repaired when the AC power to be supplied to the discharge lamp 10 is increased from the power value P2 to the power value P3, so that the occurrence of flicker may be prevented or suppressed while the discharge lamp 10 is lit in the second lighting mode.

In the discharge lamp lighting apparatus according to a third embodiment, the power supply apparatus has a function to light the discharge lamp 10 by switching the mode between the rated power lighting mode in which the rated power is supplied to the above-described discharge lamp 10 and the low power lighting mode in which power lower than the rated power is supplied to the discharge lamp 10, and is configured to supply basic AC power of the predetermined power value continuously to the discharge lamp 10 in the low power lighting mode, and supply superimposed power superimposed on this basic AC power cyclically.

Here, the power value of the basic AC power in the low power lighting mode is not specifically limited as long as being lower than the value of the rated power, and is selected normally within a range from 40 to 80% of the rated power.

The current waveform of the AC power to be supplied to the discharge lamp 10 is preferably a form in which a low-frequency component having a lower frequency than a basic frequency component is cyclically inserted into the basic frequency component.

As an example of the current waveform of the AC power supplied to the discharge lamp 10, the one exemplified in conjunction with the discharge lamp lighting apparatus according to the first embodiment, that is, those illustrated in FIG. 4 may be presented.

The frequency of the basic frequency component F1 is selected, for example, from a range from 60 to 1000 Hz. In contrast, the frequency of the low-frequency component F2 is a frequency lower than the frequency of the basic frequency component F1, and is selected, for example, from a range from 5 to 200 Hz.

The low-frequency component may have a length of half a cycle, and an insertion interval of the low-frequency component (the time interval from when a certain low frequency component is inserted until when the next low-frequency component is inserted) is preferably not more than 120 seconds and, more preferably, from 0.01 to 120 seconds.

Detailed frequencies of the basic frequency component F1 and the low-frequency component F2, an insertion interval of the low-frequency component F2, and the amplitude of the low-frequency component F2 are selected as needed by considering the design of the discharge lamp 10 to be used, specifically, a relation with respect to a thermal design of the electrodes 14, 15 or the values of the power in the respective lighting modes.

Also, the basic frequency component of the basic AC power in the low power lighting mode is preferably a frequency higher than the basic frequency component of the AC current in the rated power lighting mode and, for example, is preferably 1.1 to 10 times the frequency of the basic frequency component of the AC current in the rated power lighting mode.

Also, the low frequency component of the superimposed power in the low power lighting mode is preferably a frequency lower than the low frequency component in the rated power lighting mode and, for example, is preferably 10 to 95% of the frequency of the low frequency component of the rated power.

To give a specific example, when the rated power of the discharge lamp 10 is 230 W, and the basic AC power in the low power lighting mode is 75% of the rated power, the basic frequency component of the AC current in the rated voltage lighting mode is 370 Hz, the low-frequency component is 46.25 Hz, the basic frequency component of the basic AC power in the low power lighting mode is 518 Hz, and the low-frequency component of the superimposed power is 37 Hz.

Then, the supply timing of the superimposed power, the power value of the superimposed power, or the supply time of the superimposed power is controlled by the power supply apparatus according to a measured value of a lighting voltage of the discharge lamp 10. Here, the measured value of the lighting voltage of the discharge lamp 10 may be a value measured when the superimposed power is supplied (hereinafter, referred to as "when the power is superimposed"), or may be a value measured when the superimposed power is not supplied (hereinafter, referred to as "when the power is not superimposed").

Figure 8:
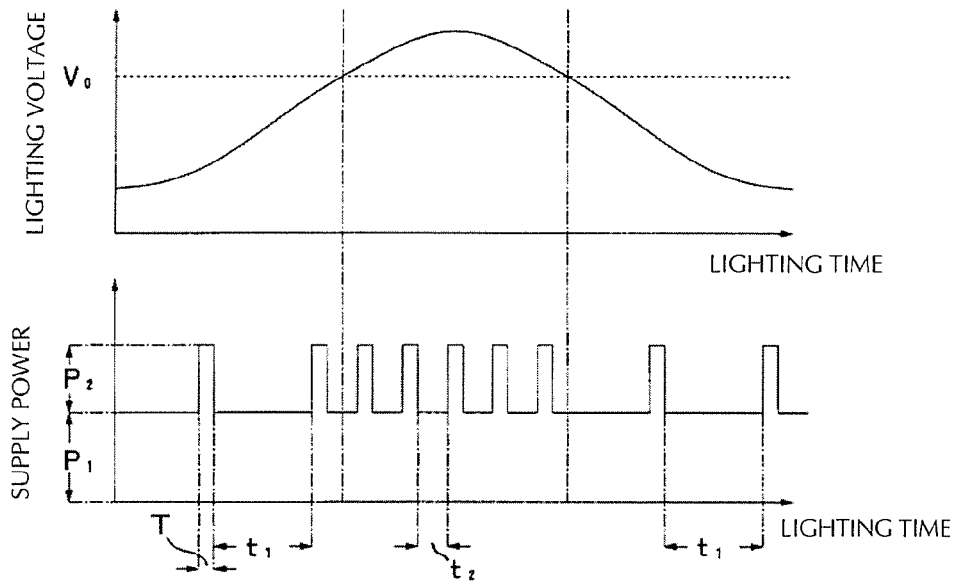
FIG. 8 is a graph illustrating, along with a change of lighting voltage of the discharge lamp, a change of value of power supplied to the discharge lamp in the low power lighting mode in an example of the power supply apparatus in a discharge lamp lighting apparatus according to a third embodiment.

FIG. 8 is a drawing illustrating a change of value of power supplied to the discharge lamp in the low power lighting mode in an example of the power supply apparatus along with the change of lighting voltage of the discharge lamp.

The power supply apparatus of this example is configured to control the supply timing of the superimposed power according to the measured value of the lighting voltage of the discharge lamp 10 in the low power lighting mode. To give a specific description, when the measured value of the lighting voltage of the discharge lamp 10 is lower than a predetermined reference value $V_0$, the basic AC power having a power value $P_1$ is supplied to the discharge lamp 10 and, simultaneously, the superimposed power having a power value $P_2$ is supplied by being superimposed on the basic AC power cyclically for a predetermined supply time T at a predetermined time interval $t_1$. When the measured value of the lighting voltage of the discharge lamp 10 is increased beyond the reference value $V_0$, the superimposed power having the power value $P_2$ is supplied to the discharge lamp 10 by being superimposed on the basic AC power cyclically for the predetermined supply time T at the predetermined time interval $t_2$ which is shorter than the time interval $t_2$, that is, the time interval of the superimposed power is changed from $t_1$ to $t_2$ which is shorter than $t_1$. When the measured value of the lighting voltage of the discharge lamp 10 is lowered again beyond the reference value $V_0$, the superimposed power of the power value $P_2$ is supplied to the discharge lamp 10 by being superimposed on the basic AC power cyclically for a predetermined supply time T at a predetermined time interval $t_1$, that is, the time interval of the superimposed power is changed from $t_2$ to $t_1$.

In the description given above, the reference value $V_0$ of the lighting voltage is set as needed considering the specifications of the discharge lamp 10, the power value $P_1$ of the basic AC power, power value $P_2$ of the superimposed power, the supply time T of the superimposed power, the time intervals $t_1$, $t_2$ of the superimposed power and so on supplied to the discharge lamp 10 in the low power lighting mode. For example, it is preferable to make the set value of the reference value $V_0$ of the lighting voltage higher as the set values of the time intervals $t_1$, $t_2$ of the superimposed power are increased.

The time interval $t_1$ of the superimposed power when the lighting voltage is lower than the reference value $V_0$ is preferably set within a range from 1 to 60 minutes, for example, although it depends on the basic AC power $P_1$, the power value $P_2$ of the superimposed power, and the supply time T of the superimposed power, and so on.

The time interval $t_2$ of the superimposed power when the lighting voltage is higher than the reference value $V_0$ only needs to be shorter than the time interval $t_1$, and is set as needed considering the power value $P_1$ of the basic AC power, power value $P_2$ of the superimposed power, the supply time T of the superimposed power, the reference value $V_0$ of the lighting voltage, and so on. For example, it is preferable to make the set value of the time interval $t_2$ of the superimposed power shorter as the set value of the reference value $V_0$ of the lighting voltage is increased.

The supply time T of the superimposed power is preferably selected within a range from 1 to 10 minutes, for example, although it depends on the power value $P_1$ of the basic AC power, the power value $P_2$ of the superimposed power, and the time interval $t_1$ of the superimposed power and the like.

The power value $P_2$ of the superimposed power is preferably set within a range from 65 to 120% of the rated power, for example, although it depends on the power value $P_1$ of the basic AC power, the supply time T of the superimposed power, the time interval $t_1$ of the superimposed power, and so on.

A further specific example will be given as follows.

Superimposed power of 173 W is supplied to supply power of 230 W in the rated power lighting mode and supply power of 138 W in the low power lighting mode, and parameters of the supply power and the superimposed power in the low power lighting mode are set according to a lamp voltage in either mode.

When the lamp voltage is lower than the reference value of the lighting voltage, the time interval of the superimposed power is elongated, and when the lamp voltage is higher than the above-described reference value, the time interval of the superimposed power is shortened. For example, when the lamp voltage is lower than a reference value of 100V, the time interval of the superimposed power is set to 15 minutes, and when the lamp voltage is equal to or higher than the reference value of 100 V, the time interval of the superimposed power is set to 5 minutes.

For reference, the supply time of the superimposed power is 2 minutes in both cases.

Alternatively, when the lamp voltage is lower than the reference value of the lighting voltage, the supply time of the superimposed power is shortened, and when the lamp voltage is higher than the reference value, the supply time of the superimposed power is elongated. For example, when the lamp voltage is lower than the reference value of 100 V, the supply time of the superimposed power is set to 2 minutes, and when the lamp voltage is equal to or higher than the reference value of 100 V, the supply time of the superimposed power is set to 4 minutes.

Also, the time interval of the superimposed power is 15 minutes in both cases.

To give a specific example of the set value of the supply power in the low power lighting mode in such a power supply apparatus, when the rated power of the discharge lamp 10 is 230 W, the power value $P_1$ of the basic AC power is 138 W (60% of the rated power), the power value $P_2$ of the superimposed power is 35 W, the supply time of the superimposed power is 2 minutes, the time interval $t_1$ of the superimposed power is 15 minutes, the time interval $t_2$ of the same is 5 minutes, and the reference value $V_0$ of the lighting voltage measured when the power is superimposed is 80 V.

Figure 9:
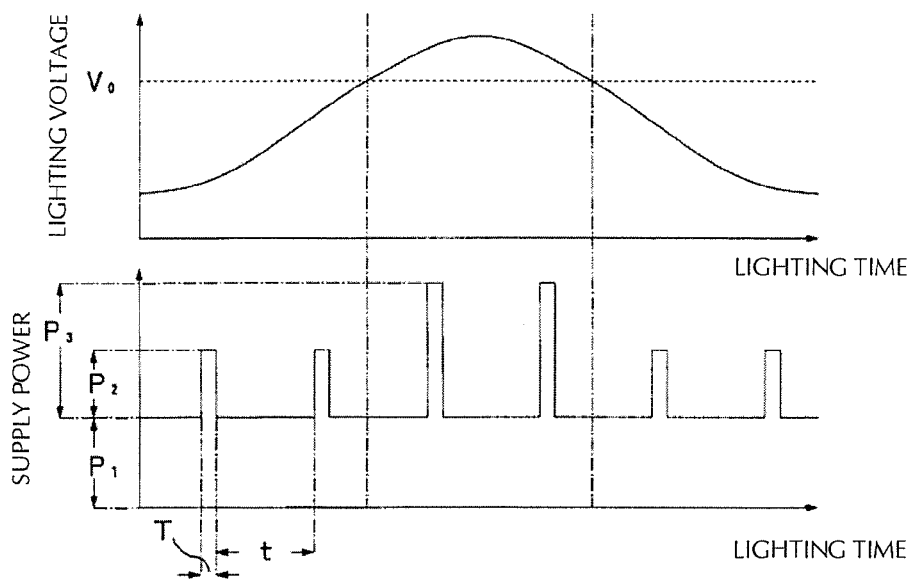
FIG. 9 is a graph illustrating, along with the change of lighting voltage of the discharge lamp, the change of value of power supplied to the discharge lamp in the low power lighting mode in another example of the power supply apparatus in the discharge lamp lighting apparatus according to the third embodiment.

FIG. 9 illustrates the change of value of power supplied to the discharge lamp in the low power lighting mode in another example of the power supply apparatus in the discharge lamp lighting apparatus according to the third embodiment along with the change of the lighting voltage of the discharge lamp.

The power supply apparatus of this example is configured to control the power value of the superimposed power according to the measured value of the lighting voltage of the discharge lamp 10 in the low power lighting mode. To give a specific description, when the measured value of the lighting voltage of the discharge lamp 10 is lower than the predetermined reference value $V_0$, the basic AC power having the power value $P_1$ is supplied to the discharge lamp 10 and, simultaneously, the superimposed power having the power value $P_2$ is supplied by being superimposed on the basic AC power cyclically for the predetermined supply time T at a predetermined time interval t. When the measured value of the lighting voltage of the discharge lamp 10 is increased beyond the predetermined reference value $V_0$, the superimposed power having the predetermined power value $P_3$ higher than the power value $P_2$ is supplied to the discharge lamp 10 by being superimposed on the basic AC power cyclically for the predetermined supply time T at the time interval t, that is, the power value of the superimposed power is changed from $P_2$ to $P_3$ higher than $P_2$. Also, when the measured value of the lighting voltage of the discharge lamp 10 is lowered again beyond the predetermined reference value $V_0$, the superimposed power having the predetermined power value $P_2$ is supplied to the discharge lamp 10 by being superimposed on the basic AC power cyclically for the predetermined supply time T at the time interval t, that is, the power value of the superimposed power is changed from $P_3$ to $P_2$.

Figure 10:
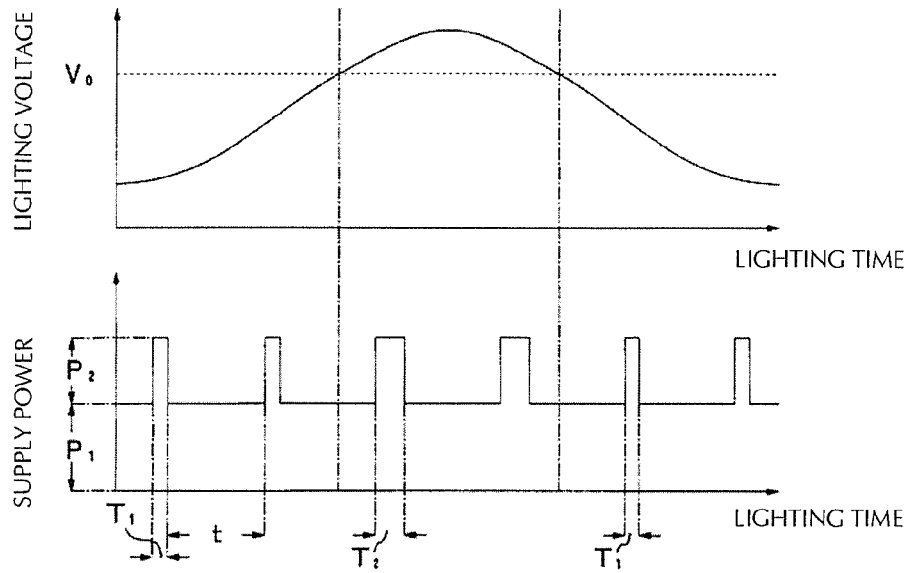
FIG. 10 is a graph illustrating, along with the change of lighting voltage of the discharge lamp, the change of value of power supplied to the discharge lamp in the low power lighting mode in still another example of the power supply apparatus in the discharge lamp lighting apparatus according to the third embodiment.

To give a specific example of the set value of the supply power in the low power lighting mode in such a power supply apparatus, when the rated power of the discharge lamp 10 is 230 W, the power value $P_1$ of the basic AC power is 138 W (60% of the rated power), the power value $P_2$ of the superimposed power is 35 W, the power value $P_3$ of the same is 92 W, the supply time T of the superimposed power is 2 minutes, the time interval t of the superimposed power is 15 minutes, and the reference value $V_0$ of the lighting voltage measured when the power is not superimposed is 70 V FIG. 10 is a drawing illustrating a change of value of power supplied to the discharge lamp in the low power lighting mode in still another example of the power supply apparatus in the discharge lamp lighting apparatus according to the third embodiment along with the change of the lighting voltage of the discharge lamp.

The power supply apparatus of this example is configured to control the supply time of the superimposed power according to the measured value of the lighting voltage of the discharge lamp 10 in the low power lighting mode. To give a specific description, when the measured value of the lighting voltage of the discharge lamp 10 is lower than the predetermined reference value $V_0$, the basic AC power having the power value $P_1$ is supplied to the discharge lamp 10 and, simultaneously, the superimposed power having the power value $P_2$ is supplied by being superimposed on the basic AC power cyclically for a predetermined supply time $T_1$ at the predetermined time interval t. When the measured value of the lighting voltage of the discharge lamp 10 is increased beyond the predetermined reference value $V_0$, the superimposed power having the power value $P_2$ is supplied to the discharge lamp 10 by being superimposed on the basic AC power cyclically for a predetermined supply time $T_2$ which is longer than the supply time $T_1$ at the predetermined time interval t, that is, the supply time of the superimposed power is changed from $T_1$ to $T_2$ which is longer than $T_1$. Also, when the measured value of the lighting voltage of the discharge lamp 10 is lowered again beyond the predetermined reference value $V_0$, the superimposed power having the predetermined power value $P_2$ is supplied to the discharge lamp 10 by being superimposed on the basic AC power cyclically for the predetermined supply time $T_1$ at the predetermined time interval t, that is, the supply time of the superimposed power is changed from $T_2$ to $T_1$.

To give a specific example of the set value of the supply power in the low power lighting mode in such a power supply apparatus, when the rated power of the discharge lamp 10 is 230 W, the power value $P_1$ of the basic AC power is 138 W (60% of the rated power), the power value $P_2$ of the superimposed power is 35 W, the supply time $T_1$ of the superimposed power is 2 minutes, the supply time $T_2$ of the same is 4 minutes, the time interval t of the superimposed power is 15 minutes, and the reference value $V_0$ of the lighting voltage measured when the power is not superimposed is 70 V.

According to the discharge lamp lighting apparatus of the third embodiment, the superimposed power which is superimposed on the basic AC power having the predetermined power value is cyclically supplied to the discharge lamp 10, and the supply timing of the superimposed power, the power value of the superimposed power, or the supply time of the superimposed power is controlled in the low power lighting mode in which power lower than the rated power is supplied to the discharge lamp 10 by the power supply apparatus, so that the amount of the evaporated electrode substance existing in the periphery of the electrodes 14, 15 of the discharge lamp 10 is increased, whereby accumulation of the evaporated electrode substance on the electrodes 14, 15 of the discharge lamp 10 is accelerated, and hence occurrence of wearing and flicker of the electrodes 14, 15 of the discharge lamp 10 may be prevented or suppressed.

The discharge lamp lighting apparatus of the present invention is not limited to the above-described embodiments, and various modifications may be made. For example, the form of the electrodes of the discharge lamp is not limited to those illustrated in FIG. 1 and, for example, may be those having head portions of a truncated conical shape.

In the first embodiment, for example, the power supply apparatus may have a function to light the discharge lamp by switching the mode between the above-described second lighting mode and a third lighting mode in which power lower than the supply power in the second lighting mode is supplied to the discharge lamp.

In the discharge lamp lighting apparatus as described above, the power supply apparatus is preferably configured to control the power to be supplied to the discharge lamp under the condition that the average power change ratio becomes a value from 0.01 to 2.1 W/s in the mode switching term in which the mode is switched from the second lighting mode to the third lighting mode and, in addition, is preferably configured to control the power to be supplied to the discharge lamp 10 under the condition that the average power change ratio is equal to or lower than 2.1 W/s in the mode switching term in which the mode is switched from the third lighting mode to the second lighting mode.

Figure 11:
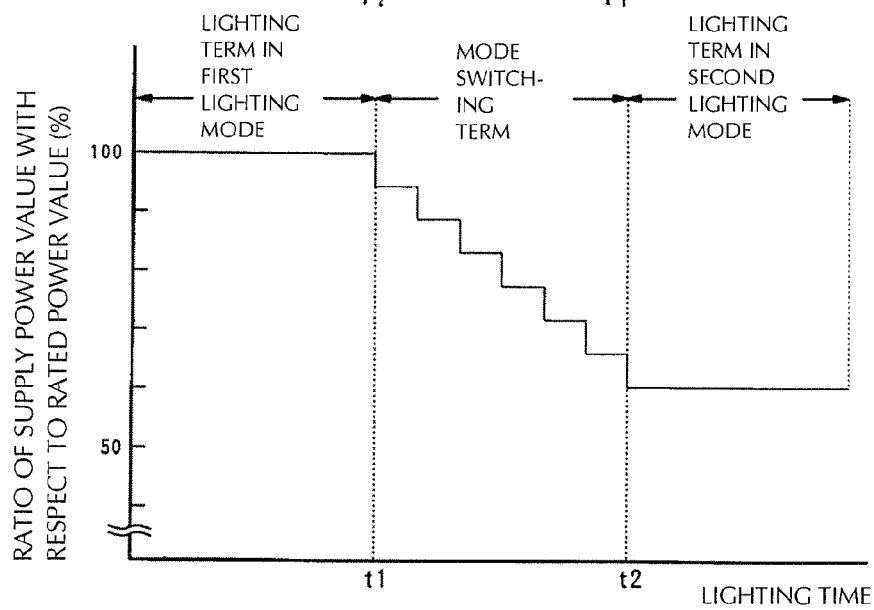
FIG. 11 is a graph illustrating another example of the change of value of power supplied to the discharge lamp in the case where the mode is switched from the first lighting mode to the second lighting mode in the discharge lamp lighting apparatus according to the first embodiment.

Also, the power supply apparatus does not need to lower the power to be supplied to the discharge lamp under the condition that the power change ratio is always constant in the mode switching term in which the mode is switched from the first lighting mode to the second lighting mode and, as illustrated in FIG. 11, the power to be supplied to the discharge lamp may be controlled so as to be lowered from the power value in the first lighting mode to the power value in the second lighting mode while repeating lowering of the power value and maintenance of the power value alternately.

Also, in the mode switching term in which the mode is switched from the second lighting mode to the first lighting mode, the power to be supplied to the discharge lamp may be controlled so as to increase from the power value in the second lighting mode to the power value in the first lighting mode while repeating increase of the power value and maintenance of the power value alternately.

Furthermore, when the power supply apparatus is configured to have a function to light the discharge lamp by switching the mode between the second lighting mode and the third lighting mode in which the power lower than the supply power in the second lighting mode is supplied to the discharge lamp, the power to be supplied to the discharge lamp may be controlled so as to be lowered from the power value in the second lighting mode to the power value in the third lighting mode, or to be increased from the power value in the third lighting mode to the power value in the second lighting mode while repeating lowering of the power value and maintenance of the power value alternately, or repeating increase of the power value and maintenance of the power value alternately in the mode switching term in which the mode is switched from the second lighting mode to the third lighting mode or in the mode switching term in which the mode is switched from the third lighting mode to the second lighting mode.

When performing the power control as described above, the power to be supplied to the discharge lamp has only to be controlled under the condition that the average power change ratio in the respective mode switching terms, that is, in a term from $t_1$ to $t_2$ in FIG. 11 becomes a value from 0.01 to 2.1 W/s.

Also, the power supply apparatus is not limited to the configuration illustrated in FIG. 2, but various circuit configurations are applicable.

In the second embodiment, for example, the power supply apparatus may have a function to light the discharge lamp by switching the mode between the above-described second lighting mode and the third lighting mode in which the power lower than the supply power in the second lighting mode is supplied to the discharge lamp.

In the discharge lamp lighting apparatus as described above, the power supply apparatus is preferably configured to control the power to be supplied to the discharge lamp under the condition including the power change such that the power value is lowered from a given power value P1 equal to or lower than the supply power in the second lighting mode and equal to or higher than the supply power in the third lighting mode to the power value P2 lower than the power value P1, and then is increased from the power value P2 to the power value P3 higher than the power value P2 and lower than the power value P1 in a switching term in which the mode is switched from the second lighting mode to the third lighting mode.

Figure 12:
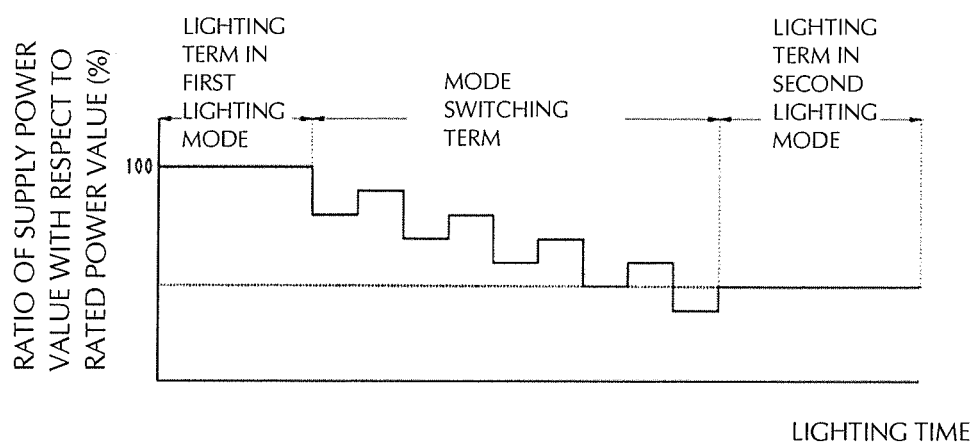
FIG. 12 is a graph illustrating another example of the change of value of power supplied to the discharge lamp in the case where the mode is switched from the first lighting mode to the second lighting mode in the discharge lamp lighting apparatus according to the second embodiment.

Also, in the power supply apparatus, the power change increasing from the power value P2 to the power value P3 does not have to be performed continuously for the power change lowering from the power value P1 to the power value P2 in the mode switching term in which the mode is switched from the first lighting mode to the second lighting mode and, as illustrated in FIG. 12 for example, the power value may be lowered from the power value P1 to the power value P2, be maintained at the power value P2, and then be increased from the power value P2 to the power value P3.

Also, when the power supply apparatus is configured to have a function to light the discharge lamp by switching the mode to or from the third lighting mode in which the power lower than the supply power in the second lighting mode is supplied to the discharge lamp, the power value may be lowered from the power value P1 to the power value P2, be maintained at the power value P2, and then be increased from the power value P2 to the power value P3 in the mode switching term in which the mode is switched from the second switching mode to the third lighting mode.

In the third embodiment, although the power supply apparatus is configured to control one of the supply timing of the superimposed power, the power value of the superimposed power, and the supply time of the superimposed power all in accordance with the measured value of the lighting voltage of the discharge lamp 10, the power supply apparatus may be configured to control two of the supply timing of the superimposed power, the power value of the superimposed power, and the supply time of the superimposed power, or to control all of the supply timing of the superimposed power, the power value of the superimposed power, and the supply time of the superimposed power.

Also, the power supply apparatus may be configured to have two or more preset reference values of the lighting voltage of the discharge lamp 10 and control the supply timing of the superimposed power, the power value of the superimposed power, or the supply time of the superimposed power on the basis of the respective reference values.

The power supply apparatus may be configured to be set to zero as the supply of the superimposed power (a state in which the superimposed power is not supplied) when the measured value of the lighting voltage of the discharge lamp is lower than the predetermined reference value.

Manufacture of Discharge Lamp

According to the configuration illustrated in FIG. 1, a discharge lamp (A) and a discharge lamp (B) having the following specifications were manufactured.

Discharge Lamp (A):

The light-emitting tube was formed of quartz glass, and the maximum diameter of the light-emitting portion was 10 mm, and the internal volume of the light-emitting portion was 65 mm$^3$.

The respective electrodes were formed of tungsten, and the inter-electrode distance was 1.0 mm.

0.3 mg/mm$^3$ of mercury, 13 kPa of argon gas at a static pressure, and halogen (Br) of $4.0 \times 10^{-4}$ μmol/mm$^3$ were enclosed in the interior of the light-emitting tube.

The rated power of the discharge lamp (A) was 230 W, the rated voltage was 80 V, and the bulb wall loading value was 2.5 W/mm$^2$.

Discharge Lamp (B):

The light-emitting tube was formed of quartz glass, and the maximum diameter of the light-emitting portion was 9.4 mm, and the internal volume of the light-emitting portion was 50 mm$^3$.

The respective electrodes were formed of tungsten, and the inter-electrode distance was 0.7 mm.

0.3 mg/mm$^3$ of mercury, 13 kPa of argon gas at a static pressure, and halogen (Br) of $5.0 \times 10^{-4}$ μmol/mm$^3$ were enclosed in the light-emitting tube.

The rated power of the discharge lamp (B) was 180 W, the rated voltage was 65 V, and the bulb wall loading value was 2.5 W/mm$^2$.

Examples of First Embodiment

Experimental Example 1

The discharge lamp (A) was fit by supplying AC power (power in which one cycle of a lower frequency component in 90 Hz was inserted at every 37.5 cycle of a basic frequency component in 370 Hz) of 230 W (rated power value), the value of power to be supplied to the discharge lamp (A) was lowered from 230 W to 138 W (60% of the rated power value) at an average power change ratio shown in Table 1, then light radiated from the discharge lamp (A) was visually observed to inspect the conditions of occurrence of flicker, then if the occurrence of the flicker was not visually recognized, luminance of an irradiated surface was measured by using a measuring instrument such as illuminance meter, and evaluated as "very good" if a rate of variability of an illuminance value was within ±2%, "good" if the rate of variability exceeds the range of ±2% but within ±3%, and "bad" if the occurrence of the flicker was visually recognized.

The operation described above was performed repeatedly by five times, and then the light-emitting tube of the discharge lamp (A) was observed to inspect the conditions of occurrence of blackening, and evaluated as "good" if occurrence of blackening was not recognized, and "bad" if the occurrence of blackening was recognized.

The results of the evaluation described above will be shown in Table 1 given below.

TABLE 1

| | Power change ratio (W/s) | | | | | | | | | | | | | |
|---|---|---|---|---|---|---|---|---|---|---|---|---|---|---|
| | 9.20 | 3.07 | 2.04 | 1.53 | 1.02 | 0.77 | 0.51 | 0.44 | 0.38 | 0.31 | 0.15 | 0.08 | 0.05 | 0.03 |
| Time of mode switching term (s) | 10 | 30 | 45 | 60 | 90 | 120 | 180 | 210 | 240 | 300 | 600 | 1200 | 1800 | 3600 |
| Condition of occurrence of flicker | bad | bad | good | good | good | very good | very good | very good | very good | very good | very good | very good | good | good |

TABLE 1-continued

| Power change ratio (W/s) | | | | | | | | | | | | | |
|---|---|---|---|---|---|---|---|---|---|---|---|---|---|
| 9.20 | 3.07 | 2.04 | 1.53 | 1.02 | 0.77 | 0.51 | 0.44 | 0.38 | 0.31 | 0.15 | 0.08 | 0.05 | 0.03 |
| good | good | good | good | good | good | good | good | good | good | good | good | good | good |

Condition of occurrence of blackening (row label for above)

Experimental Example 2

The discharge lamp (A) was it by supplying AC power (power in which one cycle of a lower frequency component in 90 Hz was inserted at every 37.5 cycle of a basic frequency component in 370 Hz) of 184 W (80% of the rated power value), the value of power to be supplied to the discharge lamp (A) was lowered from 184 W to 115 W (50% of the rated power value) at an average power change ratio shown in Table 2, then light radiated from the discharge lamp (A) was visually observed to inspect the conditions of occurrence of flicker, then if the occurrence of the flicker was not visually recognized, luminance of an irradiated surface was measured by using a measuring instrument such as illuminance meter, and evaluated as "very good" if a rate of variability of the illuminance value was within ±2%, "good" if the rate of variability exceeds the range of ±2% but within ±3%, and "bad" if the occurrence of the flicker was visually recognized.

The operation described above was performed repeatedly by five times, and then the light-emitting tube of the discharge lamp (A) was observed to inspect the conditions of occurrence of blackening, and evaluated as "good" if occurrence of blackening was not recognized, and "bad" if the occurrence of blackening was recognized.

The results of the evaluation described above will be shown in Table 2 given below.

TABLE 2

| | Power change ratio (W/s) | | | | | | | | | | | | | |
|---|---|---|---|---|---|---|---|---|---|---|---|---|---|---|
| | 6.90 | 2.30 | 1.97 | 1.15 | 0.77 | 0.58 | 0.38 | 0.33 | 0.29 | 0.23 | 0.12 | 0.06 | 0.04 | 0.02 |
| Time of mode switching term (s) | 10 | 30 | 45 | 60 | 90 | 120 | 180 | 210 | 240 | 300 | 600 | 1200 | 1800 | 3600 |
| Condition of occurrence of flicker | bad | bad | good | good | very good | very good | very good | very good | very good | very good | very good | good | good | good |
| Condition of occurrence of blackening | good | good | good | good | good | good | good | good | good | good | good | good | good | good |

Experimental Example 3

The discharge lamp (A) was lit by supplying AC power (power in which one cycle of a lower frequency component in 90 Hz was inserted at every 37.5 cycle of a basic frequency component in 370 Hz) of 184 W (80% of the rated power value), the value of power to be supplied to the discharge lamp (A) was lowered from 184 W to 138 W (60% of the rated power value) at an average power change ratio shown in Table 3 given below, then light radiated from the discharge lamp (A) was visually observed to inspect the conditions of occurrence of flicker, then if the occurrence of the flicker was not visually recognized, luminance of an irradiated surface was measured by using a measuring instrument such as illuminance meter, and evaluated as "very good" if a rate of variability of the illuminance value was within ±2%, "good" if the rate of variability exceeds the range of ±2% but within ±3%, and "bad" if the occurrence of the flicker was visually recognized.

The operation described above was performed repeatedly by five times, and then the light-emitting tube of the discharge lamp (A) was observed to inspect the conditions of occurrence of blackening and, evaluated as "good" if occurrence of blackening was not recognized, and "bad" if the occurrence of blackening was recognized.

The results of the evaluation described above will be shown in Table 3 given below.

TABLE 3

| | Power change ratio (W/s) | | | | | | | | | | | | | |
|---|---|---|---|---|---|---|---|---|---|---|---|---|---|---|
| | 4.60 | 2.30 | 1.53 | 0.77 | 0.51 | 0.38 | 0.26 | 0.22 | 0.19 | 0.15 | 0.08 | 0.04 | 0.03 | 0.013 |
| Time of mode switching term (s) | 10 | 30 | 45 | 60 | 90 | 120 | 180 | 210 | 240 | 300 | 600 | 1200 | 1800 | 3600 |
| Condition of occurrence of flicker | bad | bad | good | very good | very good | very good | very good | very good | very good | very good | very good | good | good | good |

TABLE 3-continued

| | Power change ratio (W/s) | | | | | | | | | | | | | |
|---|---|---|---|---|---|---|---|---|---|---|---|---|---|---|
| | 4.60 | 2.30 | 1.53 | 0.77 | 0.51 | 0.38 | 0.26 | 0.22 | 0.19 | 0.15 | 0.08 | 0.04 | 0.03 | 0.013 |
| Condition of occurrence of blackening | good | good | good | good | good | good | good | good | good | good | good | good | good | good |

Experimental Example 4

The discharge lamp (A) was lit by supplying AC power (power in which one cycle of a lower frequency component in 90 Hz was inserted at every 37.5 cycle of a basic frequency component in 370 Hz) of 161 W (70% of the rated power value), the value of power to be supplied to the discharge lamp (A) was lowered from 184 W to 138 W (60% of the rated power value) at an average power change ratio shown in Table 4 given below, then light radiated from the discharge lamp (A) was visually observed to inspect the conditions of occurrence of flicker, then if the occurrence of the flicker was not visually recognized, luminance of an irradiated surface was measured by using a measuring instrument such as illuminance meter, and evaluated as "very good" if a rate of variability of the illuminance value was within ±2%, "good" if the rate of variability exceeds the range of ±2% but within ±3%, and "bad" if the occurrence of the flicker was visually recognized.

The operation described above was performed repeatedly by five times, and then the light-emitting tube of the discharge lamp (A) was observed to inspect the conditions of occurrence of blackening, and evaluated as "good" if occurrence of blackening was not recognized, and "bad" if the occurrence of blackening was recognized.

The results of the evaluation described above will be shown in Table 4 given below.

Experimental Example 5

The discharge lamp (B) was lit by supplying AC power (power in which one cycle of a lower frequency component in 90 Hz was inserted at every 37.5 cycle of a basic frequency component in 370 Hz) of 180 W (rated power value), the value of power to be supplied to the discharge lamp (B) was lowered from 180 W to 108 W (60% of the rated power value) at an average power change ratio shown in Table 5 given below, then light radiated from the discharge lamp (B) was visually observed to inspect the conditions of occurrence of flicker, then if the occurrence of the flicker was not visually recognized, luminance of an irradiated surface was measured by using a measuring instrument such as illuminance meter, and evaluated as "very good" if a rate of variability of the illuminance value was within ±2%, "good" if the rate of variability exceeds the range of ±2% but within ±3%, and "bad" if the occurrence of the flicker was visually recognized.

The operation described above was performed repeatedly by five times, and then the light-emitting tube of the discharge lamp (B) was observed to inspect the conditions of occurrence of blackening, and evaluated as "good" if occurrence of blackening was not recognized, and "bad" if the occurrence of blackening was recognized.

The results of the evaluation described above will be shown in Table 5 given below.

TABLE 4

| | Power change ratio (W/s) | | | | | | | | | | | | | |
|---|---|---|---|---|---|---|---|---|---|---|---|---|---|---|
| | 2.30 | 1.53 | 0.77 | 0.38 | 0.26 | 0.19 | 0.13 | 0.10 | 0.10 | 0.08 | 0.04 | 0.02 | 0.013 | 0.006 |
| Time of mode switching term (s) | 10 | 30 | 45 | 60 | 90 | 120 | 180 | 210 | 240 | 300 | 600 | 1200 | 1800 | 3600 |
| Condition of occurrence of flicker | bad | good | very good | very good | very good | very good | very good | very good | very good | very good | good | good | good | good |
| Condition of occurrence of blackening | good | good | good | good | good | good | good | good | good | good | good | good | good | bad |

TABLE 5

| | Power change ratio (W/s) | | | | | | | | | | | | | |
|---|---|---|---|---|---|---|---|---|---|---|---|---|---|---|
| | 7.20 | 2.40 | 2.06 | 1.20 | 0.80 | 0.60 | 0.40 | 0.34 | 0.30 | 0.24 | 0.12 | 0.06 | 0.04 | 0.02 |
| Time of mode switching term (s) | 10 | 30 | 45 | 60 | 90 | 120 | 180 | 210 | 240 | 300 | 600 | 1200 | 1800 | 3600 |
| Condition of occurrence of flicker | bad | bad | good | good | good | very good | very good | very good | very good | very good | very good | very good | good | good |

TABLE 5-continued

| | Power change ratio (W/s) | | | | | | | | | | | | | |
|---|---|---|---|---|---|---|---|---|---|---|---|---|---|---|
| | 7.20 | 2.40 | 2.06 | 1.20 | 0.80 | 0.60 | 0.40 | 0.34 | 0.30 | 0.24 | 0.12 | 0.06 | 0.04 | 0.02 |
| Condition of occurrence of blackening | good | good | good | good | good | good | good | good | good | good | good | good | good | good |

As is apparent from the results in Table 1 to Table 5, it was found that when the power to be supplied to the discharge lamp was lowered under the condition that the average power change ratio became 0.01 to 2.1 W/s, the flicker did not occur and even when lowering of the power to be supplied to the discharge lamp under the condition described above was performed repeatedly, blackening of the light-emitting tube of the discharge lamp did not occur.

Experimental Example 6

The discharge lamp (A) was lit by supplying AC power (power in which one cycle of a lower frequency component in 90 Hz was inserted at every 37.5 cycle of a basic frequency component in 370 Hz) of 138 W (60% of the rated power value), the value of power to be supplied to the discharge lamp (A) was increased from 138 W to 230 W (the rated power value) at an average power change ratio shown in Table 6 given below, then the light-emitting tube was visually observed to inspect the conditions of occurrence of cracks, and evaluated as "good" if no crack occurred in the light-emitting tube, and "bad" if the crack occurred in the light-emitting tube.

The operation described above was performed repeatedly by five times, and then the light-emitting tube of the discharge lamp (A) was observed to inspect the conditions of occurrence of blackening, and evaluated as "good" if occurrence of blackening was not recognized, and "bad" if the occurrence of blackening was recognized.

The results of the evaluation described above will be shown in Table 6 given below.

Experimental Example 7

The discharge lamp (A) was it by supplying AC power (power in which one cycle of a lower frequency component in 90 Hz was inserted at every 37.5 cycle of a basic frequency component in 370 Hz) of 115 W (50% of the rated power value), the value of power to be supplied to the discharge lamp (A) was increased from 115 W to 184 W (80% of the rated power value) at an average power change ratio shown in Table 7 given below, then the light-emitting tube was visually observed to inspect the conditions of occurrence of cracks, and evaluated as "good" if no crack occurred in the light-emitting tube, and "bad" if the crack occurred in the light-emitting tube.

The operation described above was performed repeatedly by five times, and then the light-emitting tube of the discharge lamp (A) was observed to inspect the conditions of occurrence of blackening, and evaluated as "good" if occurrence of blackening was not recognized, and "bad" if the occurrence of blackening was recognized.

The results of the evaluation described above will be shown in Table 7 given below.

TABLE 6

| | Power change ratio (W/s) | | | | | | | | | | | | | |
|---|---|---|---|---|---|---|---|---|---|---|---|---|---|---|
| | 9.20 | 3.07 | 2.04 | 1.53 | 1.02 | 0.77 | 0.51 | 0.44 | 0.38 | 0.31 | 0.15 | 0.08 | 0.05 | 0.03 |
| Time of mode switching term (s) | 10 | 30 | 45 | 60 | 90 | 120 | 180 | 210 | 240 | 300 | 600 | 1200 | 1800 | 3600 |
| Condition of occurrence of crack | bad | bad | good | good | good | good | good | good | good | good | good | good | good | good |
| Condition of occurrence of blackening | good | good | good | good | good | good | good | good | good | good | good | good | good | good |

TABLE 7

| | Power change ratio (W/s) | | | | | | | | | | | | | |
|---|---|---|---|---|---|---|---|---|---|---|---|---|---|---|
| | 6.90 | 2.30 | 1.97 | 1.15 | 0.77 | 0.58 | 0.38 | 0.33 | 0.29 | 0.23 | 0.12 | 0.06 | 0.04 | 0.02 |
| Time of mode switching term (s) | 10 | 30 | 45 | 60 | 90 | 120 | 180 | 210 | 240 | 300 | 600 | 1200 | 1800 | 3600 |
| Condition of occurrence of crack | bad | bad | good | good | good | good | good | good | good | good | good | good | good | good |
| Condition of occurrence of blackening | good | good | good | good | good | good | good | good | good | good | good | good | good | good |

Experimental Example 8

The discharge lamp (A) was lit by supplying AC power (power in which one cycle of a lower frequency component in 90 Hz was inserted at every 37.5 cycle of a basic frequency component in 370 Hz) of 138 W (60% of the rated power value), the value of power to be supplied to the discharge lamp (A) was increased from 138 W to 184 W (80% of the rated power value) at an average power change ratio shown in Table 8 given below, then the light-emitting tube was visually observed to inspect the conditions of occurrence of cracks, and evaluated as "good" if no crack occurred in the light-emitting tube, and "bad" if the crack occurred in the light-emitting tube.

The operation described above was performed repeatedly by five times, and then the light-emitting tube of the discharge lamp (A) was observed to inspect the conditions of occurrence of blackening, and evaluated as "good" if occurrence of blackening was not recognized, and "bad" if the occurrence of blackening was recognized.

The results of the evaluation described above will be shown in Table 8 given below.

TABLE 8

| | Power change ratio (W/s) | | | | | | | | | | | | | |
|---|---|---|---|---|---|---|---|---|---|---|---|---|---|---|
| | 4.60 | 2.30 | 1.53 | 0.77 | 0.51 | 0.38 | 0.26 | 0.22 | 0.19 | 0.15 | 0.08 | 0.04 | 0.03 | 0.013 |
| Time of mode switching term (s) | 10 | 30 | 45 | 60 | 90 | 120 | 180 | 210 | 240 | 300 | 600 | 1200 | 1800 | 3600 |
| Condition of occurrence of crack | bad | bad | good | good | good | good | good | good | good | good | good | good | good | good |
| Condition of occurrence of blackening | good | good | good | good | good | good | good | good | good | good | good | good | good | good |

90 Hz was inserted at every 37.5 cycle of a basic frequency component in 370 Hz) of 138 W (60% of the rated power value), the value of power to be supplied to the discharge lamp (A) was increased from 138 W to 161 W (70% of the rated power value) at an average power change ratio shown in Table 9 given below, then the light-emitting tube was visually observed to inspect the conditions of occurrence of cracks, and evaluated as "good" if no crack occurred in the light-emitting tube, and "bad" if the crack occurred in the light-emitting tube.

The operation described above was performed repeatedly by five times, and then the light-emitting tube of the discharge lamp (A) was observed to inspect the conditions of occurrence of blackening, and evaluated as "good" if occurrence of blackening was not recognized, and "bad" if the occurrence of blackening was recognized.

The results of the evaluation described above will be shown in Table 9 given below.

Experimental Example 9

The discharge lamp (A) was lit by supplying AC power (power in which one cycle of a lower frequency component in

TABLE 9

| | Power change ratio (W/s) | | | | | | | | | | | | | |
|---|---|---|---|---|---|---|---|---|---|---|---|---|---|---|
| | 2.30 | 1.53 | 0.77 | 0.38 | 0.26 | 0.19 | 0.13 | 0.10 | 0.10 | 0.08 | 0.04 | 0.02 | 0.013 | 0.006 |
| Time of mode switching term (s) | 10 | 30 | 45 | 60 | 90 | 120 | 180 | 210 | 240 | 300 | 600 | 1200 | 1800 | 3600 |
| Condition of occurrence of crack | bad | good | good | good | good | good | good | good | good | good | good | good | good | good |

TABLE 9-continued

| | Power change ratio (W/s) | | | | | | | | | | | | | |
|---|---|---|---|---|---|---|---|---|---|---|---|---|---|---|
| | 2.30 | 1.53 | 0.77 | 0.38 | 0.26 | 0.19 | 0.13 | 0.10 | 0.10 | 0.08 | 0.04 | 0.02 | 0.013 | 0.006 |
| Condition of occurrence of blackening | good | good | good | good | good | good | good | good | good | good | good | good | good | bad |

Experimental Example 10

The discharge lamp (B) was it by supplying AC power (power in which one cycle of a lower frequency component in 90 Hz was inserted at every 37.5 cycle of a basic frequency component in 370 Hz) of 108 W (60% of the rated power value), the value of power to be supplied to the discharge lamp (B) was increased from 108 W to 180 W (the rated power value) at an average power change ratio shown in Table 10 given below, then the light-emitting tube was visually observed to inspect the conditions of occurrence of cracks, and evaluated as "good" if no crack occurred in the light-emitting tube, and "bad" if the crack occurred in the light-emitting tube. The result is shown in Table 10 given below.

The operation described above was performed repeatedly by five times, and then the light-emitting tube of the discharge lamp (B) was observed to inspect the conditions of occurrence of blackening, and evaluated as "good" if occurrence of blackening was not recognized, and "bad" if the occurrence of blackening was recognized.

The results of the evaluation described above will be shown in Table 10 given below.

TABLE 10

| | Power change ratio (W/s) | | | | | | | | | | | | | |
|---|---|---|---|---|---|---|---|---|---|---|---|---|---|---|
| | 7.20 | 2.40 | 2.06 | 1.20 | 0.80 | 0.60 | 0.40 | 0.34 | 0.30 | 0.24 | 0.12 | 0.06 | 0.04 | 0.02 |
| Time of mode switching term (s) | 10 | 30 | 45 | 60 | 90 | 120 | 180 | 210 | 240 | 300 | 600 | 1200 | 1800 | 3600 |
| Condition of occurrence of crack | bad | bad | good | good | good | good | good | good | good | good | good | good | good | good |
| Condition of occurrence of blackening | good | good | good | good | good | good | good | good | good | good | good | good | good | good |

As is apparent from the results in Table 6 to Table 10, it was found that when the power to be supplied to the discharge lamp was increased under the condition that the average power change ratio became 0.01 to 2.1 W/s, the cracks did not occur in the light-emitting tube, and even when lowering of the power to be supplied to the discharge lamp under the condition described above was performed repeatedly, blackening of the light-emitting tube of the discharge lamp did not occur.

Examples of Second Embodiment

Experimental Example 1

Figure 13:
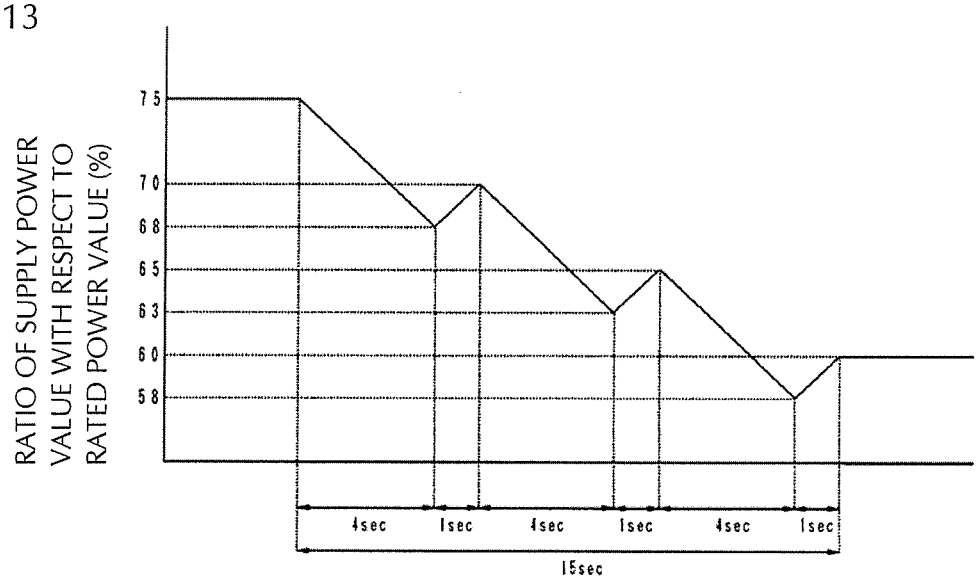
FIG. 13 is a graph illustrating the change of value of power supplied to a discharge lamp in Experimental Example 1 in an example according to the second embodiment.
Figure 14A:
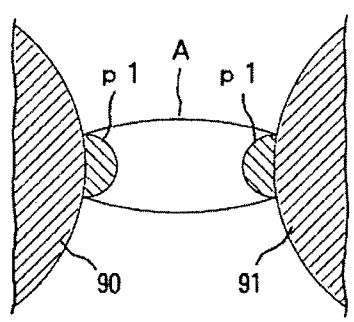
FIGS. 14(a)-14(d) are explanatory views illustrating electrodes and a change of the shape of arcs of the discharge lamp in the mode switching term in which the mode is switched from the first lighting to the second lighting mode in the discharge lamp lighting apparatus of the related art.
Figure 14B:
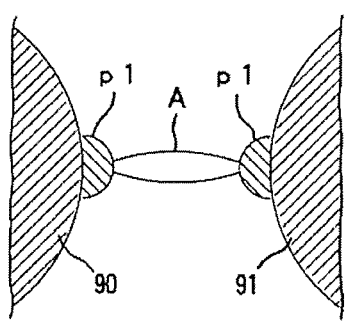
Figure 14C:
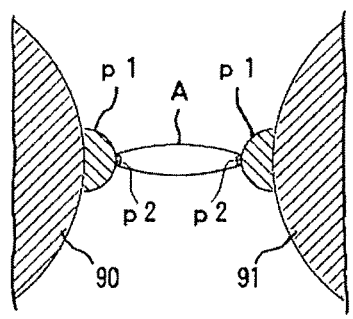
Figure 14D:
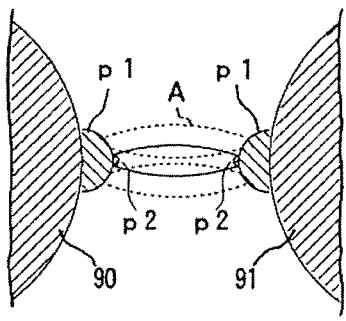
Figure 14E:
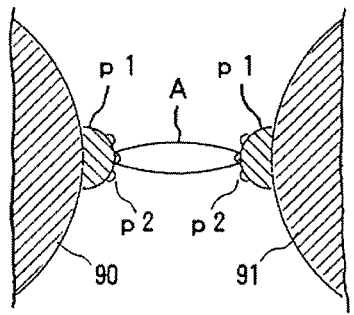

The discharge lamp (A) was lit by supplying AC power (power in which one cycle of a lower frequency component in 90 Hz was inserted at every 37.5 cycle of a basic frequency component in 370 Hz) having a power of 75% of the rated power value (172.5 W), the power to be supplied to the discharge lamp (A) was lowered by 7% of the rated power (16.1 W) during four seconds (average power change ratio of 4.025 W/s), then the power change (the power change of lowering by 5% of the rated power (11.5 W) in the cycle of 5 seconds) to increase the power by 2% of the rated power (4.6 W) (average power change ratio of 4.6 W) in one second was repeated three times, whereby the power was lowered to 60% of the rated power value (132 W). A graph of change of the value of the power to be supplied to the discharge lamp in Experimental Example 1 is illustrated in FIG. 13.

When light radiated from the discharge lamp (A) was visually observed in a state in which the power to be supplied to the discharge lamp (A) is maintained at 60% of the rated power value (132 W), occurrence of the flicker was not recognized.

Comparative Experimental Example 1

When the discharge lamp (A) was lit by supplying AC power (power in which one cycle of a lower frequency component in 90 Hz was inserted at every 37.5 cycle of a basic frequency component in 370 Hz) having a power of 75% of the rated power value (172.5 W), and the power to be supplied to the discharge lamp (A) was lowered by 15% of the rated power (34.5 W) during 30 seconds (average power change ratio of 2.3 W/s), whereby the power value was lowered to 60% of the rated power value (132 W), and when the light radiated from the discharge lamp (A) was observed in this state, occurrence of the flicker was recognized.

Examples of Third Embodiment

Experimental Example 1

When the discharge lamp (A) was lit for 200 hours by supplying a basic AC power and a superimposed power to the discharge lamp (A) under the condition given below, then when light radiated from the discharge lamp (A) after having lit the discharge lamp (A) for 200 hours was visually observed, occurrence of flicker was not recognized, and when the electrodes of the discharge lamp (A) were observed, no abnormality was recognized.

Basic AC Power
Current Frequency: 740 Hz
Power Value: 138 W (60% of the rated power value)
Superimposed Power
Current Frequency: 518 Hz
Superimposed Power Value: 35 W (sum of the basic AC power and the superimposed power was 173 W)
Supply Time: 2 minutes
Time Interval:
  When the measured value of the lighting voltage when the superimposed power was supplied was equal to or lower than 80 V; 15 minutes
  When the measured value of the lighting voltage when the superimposed power was supplied exceeded 80 V; 5 minutes Experimental Example 2

When the discharge lamp (A) was lit for 200 hours by supplying a basic AC power and a superimposed power to the discharge lamp (A) under the condition given below, then when light radiated from the discharge lamp (A) after having lit the discharge lamp (A) for 200 hours was visually observed, occurrence of flicker was not recognized, and when the electrodes of the discharge lamp (A) were observed, no abnormality was recognized.
Basic AC Power
Current Frequency: 740 Hz
Power Value: 138 W (60% of the rated power value)
Superimposed Power
Current Frequency: 518 Hz
Superimposed Power Value: 35 W (sum of the basic AC power and the superimposed power was 173 W)
Supply Time: 2 minutes
Time Interval:
  15 minutes when the measured value of the lighting voltage when the superimposed power was supplied was lower than 80 V;
  10 minutes when the measured value of the lighting voltage when the superimposed power was supplied was equal to or larger than 80 V and lower than 100 V;
  15 minutes when the measured value of the lighting voltage when the superimposed power was supplied was equal to or higher than 100 V;

Experimental Example 3

When the discharge lamp (A) was lit for 200 hours by supplying the basic AC power and the superimposed power to the discharge lamp (A) under the condition given below, then when light radiated from the discharge lamp (A) after having lit the discharge lamp (A) for 200 hours was visually observed, occurrence of flicker was not recognized, and when the electrodes of the discharge lamp (A) were observed, no abnormality was recognized.
Basic AC Power
Current Frequency: 740 Hz
Power Value: 138 W (60% of the rated power value)
Superimposed Power
Current Frequency: 518 Hz
Superimposed Power Value: 35 W (sum of the basic AC power and the superimposed power was 173 W)
Time Interval:
  5 minutes when the measured value of the lighting voltage when the superimposed power was not supplied was lower than 75 V;
  15 minutes when the measured value of the lighting voltage when the superimposed power was not supplied was equal to or higher than 75 V;
Supply Time: 2 minutes Experimental Example 4

When the discharge lamp (A) was lit for 200 hours by supplying the basic AC power and the superimposed power to the discharge lamp (A) under the condition given below, then when light radiated from the discharge lamp (A) after having lit the discharge lamp (A) for 200 hours was visually observed, occurrence of flicker was not recognized, and when the electrodes of the discharge lamp (A) were observed, no abnormality was recognized.
Basic AC Power
Current Frequency: 740 Hz
Power Value: 138 W (60% of the rated power value)
Superimposed Power
Current Frequency: 518 Hz
Superimposed Power Value: 35 W (sum of the basic AC power and the superimposed power was 173 W)
Supply Time:
  2 minutes when the measured value of the lighting voltage when the superimposed power was not supplied was lower than 70 V;
  4 minutes when the measured value of the lighting voltage when the superimposed power was not supplied was equal to or higher than 70 V;
Time Interval: 15 minutes Experimental Example 5

When the discharge lamp (A) was lit for 200 hours by supplying a basic AC power and a superimposed power to the discharge lamp (A) under the condition given below, then when light radiated from the discharge lamp (A) after having lit the discharge lamp (A) for 200 hours was visually observed, occurrence of flicker was not recognized, and when the electrodes of the discharge lamp (A) were observed, no abnormality was recognized.
Basic AC Power
Current Frequency: 740 Hz
Power Value: 138 W (60% of the rated power value)
Superimposed Power
Current Frequency: 518 Hz
Superimposed Power Value:
  When the measured value of the lighting voltage when the superimposed power was not supplied was lower than 70 V; 35 V (the sum of the basic AC power and the superimposed power was 173 W)
  When the measured value of the lighting voltage when the superimposed power was not supplied exceeded 70 V; 92 V (the sum of the basic AC power and the superimposed power was 230 W)
Time Interval: 15 minutes
Supply Time: 2 minutes Experimental Example 6

When the discharge lamp (A) was lit for 200 hours by supplying the basic AC power and the superimposed power to the discharge lamp (A) under the condition given below, then when light radiated from the discharge lamp (A) after having lit the discharge lamp (A) for 200 hours was visually observed, occurrence of flicker was not recognized, and when the electrodes of the discharge lamp (A) were observed, no abnormality was recognized.
Basic AC Power
Current Frequency: 740 Hz
Power Value: 138 W (60% of the rated power value)
Superimposed Power
Current Frequency: 518 Hz
Superimposed Power Value:
  When the measured value of the lighting voltage when the superimposed power was not supplied was lower than 70 V; 35 V (the sum of the basic AC power and the superimposed power was 173 W)
  When the measured value of the lighting voltage when the superimposed power was not supplied exceeded 70 V; 92 V (the sum of the basic AC power and the superimposed power was 230 W)
Time Interval: 15 minutes
Supply Time: 2 minutes
  When the measured value of the lighting voltage when the superimposed power was not supplied was equal to or lower than 70 V; 3 minutes
  When the measured value of the lighting voltage when the superimposed power was not supplied exceeded 70 V; 4 minutes Experimental Example 7

When the discharge lamp (A) was lit for 200 hours by supplying a basic AC power and a superimposed power to the discharge lamp (A) under the condition given below, then when light radiated from the discharge lamp (A) after having lit the discharge lamp (A) for 200 hours was visually observed, occurrence of flicker was not recognized, and when the electrodes of the discharge lamp (A) were observed, no abnormality was recognized.
Basic AC Power
Current Frequency: 740 Hz
Power Value: 138 W (60% of the rated power value)
Superimposed Power
Current Frequency: 518 Hz
Superimposed Power Value: 35 V
Time Interval: 5 minutes at the shortest
Supply Time:
  When the measured value of the lighting voltage when the superimposed power was not supplied was equal to or lower than 70 V; 0 minute
  When the measured value of the lighting voltage when the superimposed power was not supplied exceeded 70 V; 2 minutes Comparative Experimental Example 1

When light radiated from the discharge lamp (A) was visually observed after having lit the discharge lamp (A) for 200 hours by supplying AC power having a power value of 138 W (60% of the rated power value) in a current frequency of 740 Hz to the discharge lamp (A), occurrence of the flicker was recognized. Also, when the electrodes of the discharge lamp (A) were observed, wearing of the distal ends was recognized.

What is claimed is:
1. A discharge lamp lighting apparatus comprising:
  a discharge lamp having a pair of electrodes formed of tungsten and having projections at distal ends thereof; and
  a power supply apparatus configured to supply AC power to the discharge lamp to light the discharge lamp,
wherein:
  the power supply apparatus is switchable between a first lighting mode in which rated power is supplied to the discharge lamp and a second lighting mode in which power lower than the rated power is supplied to the discharge lamp,
  the power supply apparatus is configured to supply AC power having a power waveform in which a low-frequency component has a frequency lower than a basic frequency component, the low-frequency component being in a range from 60 to 1000 Hz and being cyclically inserted into the basic frequency component supplied to the discharge lamp, and
  the power supply apparatus is configured to control power supplied to the discharge lamp with an average power change ratio of 0.01 to 2.1 W/s in a mode switching period in which the mode is switched from the first lighting mode to the second lighting mode.

2. The discharge lamp lighting apparatus according to claim 1, wherein the power supply apparatus is configured to control the power to be supplied to the discharge lamp with the average power change ratio is approximately equal to 2.1 W/s in the mode switching period in which the mode is switched from the second lighting mode to the first lighting mode.

3. The discharge lamp lighting apparatus according to claim 1, wherein the power supply apparatus has a third lighting mode and is switchable between the second lighting mode and the third lighting mode, power supplied is supplied to the discharge lamp in the third lighting mode being lower than the power is supplied to the discharge lamp in the second lighting mode, and wherein the power supply apparatus is configured to control the power to be supplied to the discharge lamp with an average power change ratio of 0.01 to 2.1 W/s in a mode switching period in which the mode is switched from the second lighting mode to the third lighting mode.

4. The discharge lamp lighting apparatus according to claim 1, wherein the power supply apparatus is configured to control the power to be supplied to the discharge lamp with the average power change ratio is being substantially equal to 2.1 W/s in the mode switching period in which the mode is switched from the third lighting mode to the second lighting mode.

5. A discharge lamp lighting apparatus comprising:
  a discharge lamp having a pair of electrodes formed with projections at distal ends thereof; and
  a power supply apparatus configured to supply AC power to the discharge lamp to light the discharge lamp,
wherein
  the power supply apparatus has a switching the mode for switching between a first lighting mode in which rated power is supplied to the discharge lamp and a second lighting mode in which power lower than the rated power is supplied to the discharge lamp, and is configured to control the power to be supplied to the discharge lamp under the condition that a power value is lowered from a given power value P1 equal to or lower than the supply power in the first lighting mode and equal to or higher than the supply power in the second lighting mode to a power value P2 lower than the power value P1, and then is increased from the power value P2 to a power value P3 higher than the power value P2 and lower than the power value P1 in a mode switching period in which the lighting mode is switched from the first lighting mode to the second lighting mode.

6. The discharge lamp lighting apparatus according to claim 5, wherein the power supply apparatus is configured to control the power supplied to the discharge lamp with two or more power changes in which the power is lowered from the power value P1 to the power value P2, and then increased from the power value P2 to the power value P3 in a mode switching period in which the lighting mode is switched from the first lighting mode to the second lighting mode.

7. The discharge lamp lighting apparatus according to claim 5, wherein the power supply apparatus has a third lighting mode in which power lower than the supply power in the second lighting mode is supplied to the discharge lamp, and wherein the power supply apparatus is configured to switch between the second lighting mode and the third lighting mode, the power being supplied to the discharge lamp under the condition that the power value is lowered from the given power value P1 to the power value P2, and then is increased from the power value P2 to the power value P3 in a mode switching period in which the lighting mode is switched for the second lighting mode to the third lighting mode.

8. The discharge lamp lighting apparatus according to claim 7, wherein the power supply apparatus is configured to control the power to be supplied to the discharge lamp via two or more power changes in which the power is lowered from the power value P1 to the power value P2, and then the power is increased from the power value P2 to the power value P3 in the mode switching period in which the lighting mode is switched from the second lighting mode to the third lighting mode.

9. A discharge lamp lighting apparatus comprising:
a discharge lamp; and
a power supply apparatus configured to supply AC power to the discharge lamp to light the discharge lamp,
wherein
the power supply apparatus is configured for switching between a rated power lighting mode in which rated power is supplied to the discharge lamp and a low power lighting mode in which power lower than the rated power is supplied to the discharge lamp, and is configured to supply basic AC power having a predetermined power value continuously to the discharge lamp, and to cyclically superimpose a superimposed power on the basic AC power and simultaneously control supply timing of the superimposed power, the power value of the superimposed power, or the supply time of the superimposed power according to a measured value of lighting voltage of the discharge lamp in the low power lighting mode.

10. The discharge lamp lighting apparatus according to claim 9, wherein the power supply apparatus is configured to control supply timing of the superimposed power so as to supply the superimposed power to the discharge lamp at a shorter time interval when the measured value of the lighting voltage of the discharge lamp is higher than a predetermined reference value than when the measured value is lower than the predetermined reference value in the low power lighting mode.

11. The discharge lamp lighting apparatus according to claim 9, wherein the power supply apparatus is configured to control the power value of the superimposed power so as to supply the superimposed power to the discharge lamp at a higher power value when the measured value of the lighting voltage of the discharge lamp is higher than the predetermined reference value than when the measured value is lower than the predetermined reference value in the low power lighting mode.

12. The discharge lamp lighting apparatus according to claim 9, wherein the power supply apparatus is configured to control the supply time of the superimposed power so as to supply the superimposed power to the discharge lamp for a longer time when the measured value of the lighting voltage of the discharge lamp is higher than the predetermined reference value than when the measured value is lower than the predetermined reference value in the low power lighting mode.

13. The discharge lamp lighting apparatus according to claim 9, wherein the measured value of the lighting voltage of the discharge lamp is measured when the superimposed power is not supplied.

14. The discharge lamp lighting apparatus according to claim 9, wherein the measured value of the lighting voltage of the discharge lamp is measured when the superimposed power is supplied.

* * * * *